US012726314B2

(12) United States Patent
Wu et al.

(10) Patent No.: US 12,726,314 B2
(45) Date of Patent: Sep. 1, 2026

(54) METHOD AND DEVICE FOR WIRELESS REFERENCE SIGNAL PROCESSING

(71) Applicant: Apogee 5G Global, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 204 days.

(21) Appl. No.: 18/641,445

(22) Filed: Apr. 22, 2024

(65) Prior Publication Data

US 2024/0291614 A1 Aug. 29, 2024

Related U.S. Application Data

(63) Continuation of application No. PCT/CN2022/124568, filed on Oct. 11, 2022.

(30) Foreign Application Priority Data

Oct. 23, 2021 (CN) ......................... 202111237933.9

(51) Int. Cl.
*H04L 5/00* (2006.01)

(52) U.S. Cl.
CPC .......... *H04L 5/0051* (2013.01); *H04L 5/0094* (2013.01)

(58) Field of Classification Search
CPC ............................ H04L 5/0051; H04L 5/0094
See application file for complete search history.

(56) References Cited

U.S. PATENT DOCUMENTS 11,445,387 B2 9/2022 Bagheri et al.
11,510,180 B2 11/2022 Wu et al.
11,949,485 B2 4/2024 Koskela et al.
(Continued)

FOREIGN PATENT DOCUMENTS

CN 111082909 A 4/2020
CN 111526575 A 8/2020
(Continued)

OTHER PUBLICATIONS

ISR received in application No. PCT/CN2022/124568 dated Jan. 5, 2023.
(Continued)

*Primary Examiner* — Duc C Ho
(74) *Attorney, Agent, or Firm* — Volpe Koenig

(57) ABSTRACT

First node receives a first configuration information block, a first reference signal and a first signal; the first configuration information block being used to determine configuration information for a first reference signal, which includes a first TCI state; the configuration information for the first reference signal being used to determine a first PCI, the first signal indicating a second PCI; the first reference signal and the first signal are overlapping in time domain; the second PCI is not equal to a PCI of a target cell, the target cell being a serving cell of the first node; whether the first reference signal and the first signal are quasi-co-located is related to whether the first PCI and the second PCI are equal. This allows the UE to flexibly choose to prioritize the reception of the reference signal of the serving cell or the synchronization signal of the additional cell as needed.

20 Claims, 5 Drawing Sheets

(56) References Cited

U.S. PATENT DOCUMENTS

| | | | |
|---|---|---|---|
| 12,342,262 B2 | 6/2025 | Ji et al. | |
| 2020/0092141 A1 | 3/2020 | Chen et al. | |
| 2021/0328710 A1 | 10/2021 | Zhou et al. | |
| 2022/0046644 A1* | 2/2022 | Oh | H04L 5/0048 |
| 2022/0368486 A1* | 11/2022 | Khoshnevisan | H04L 5/001 |
| 2024/0154762 A1 | 5/2024 | Li | |

FOREIGN PATENT DOCUMENTS

| | | |
|---|---|---|
| EP | 3866349 A1 | 8/2021 |
| WO | 2021060954 A1 | 4/2021 |

OTHER PUBLICATIONS

Ericsson "On non-serving PCI related aspects of mTRP operation" 3GPP TSG-RAN WG2 #115-e R2-2108807 Aug. 27, 2021.

Apple Inc., "On Inter-Cell Multi-TRP Enhancement," 3GPP TSG-RAN WG1 Meeting #106b-e, R1-2110015, e-Meeting (Oct. 11-19, 2021).

Futurewei, "Inter-cell multi-TRP operation," 3GPP TSG RAN WG1 #104bis-e, R1-2102762, e-Meeting (Apr. 12-20, 2021).

Nokia et al., "Enhancements on Multi-beam Operation," 3GPP TSG-RAN WG1 Meeting #106b-e, R1-2109870, e-Meeting (Oct. 11-19, 2021).

NTT Docomo, Inc., "Status Report of WI on New Radio Access Technology," 3GPP TSG RAN meeting #84, RP-191031, Newport Beach, USA (Jun. 3-6, 2019).

Qualcomm Incorporated, "Enhancements on Multi-beam Operation," 3GPP TSG RAN WG1 Meeting #106-bis-e, R1-2110165 (Oct. 11-19, 2021).

Third Generation Partnership Project, "Technical Specification Group Radio Access Network; NR; Physical channels and modulation (Release 16)," 3GPP TS 38.211 V16.7.0 (Sep. 2021).

Third Generation Partnership Project, "Technical Specification Group Radio Access Network; NR; Multiplexing and channel coding (Release 16)," 3GPP TS 38.212 V16.7.0 (Sep. 2021).

Third Generation Partnership Project, "Technical Specification Group Radio Access Network; NR; Physical layer procedures for control (Release 16)," 3GPP TS 38.213 V16.7.0 (Sep. 2021).

Third Generation Partnership Project, "Technical Specification Group Radio Access Network; NR; Physical layer procedures for data (Release 16)," 3GPP TS 38.214 V16.7.0 (Sep. 2021).

Third Generation Partnership Project, "Technical Specification Group Radio Access Network; NR; Medium Access Control (MAC) protocol specification (Release 16)," 3GPP TS 38.321 V16.6.0 (Sep. 2021).

Third Generation Partnership Project, "Technical Specification Group Radio Access Network; NR; Radio Resource Control (RRC) protocol specification (Release 16)," 3GPP TS 38.331 V16.6.0 (Sep. 2021).

* cited by examiner

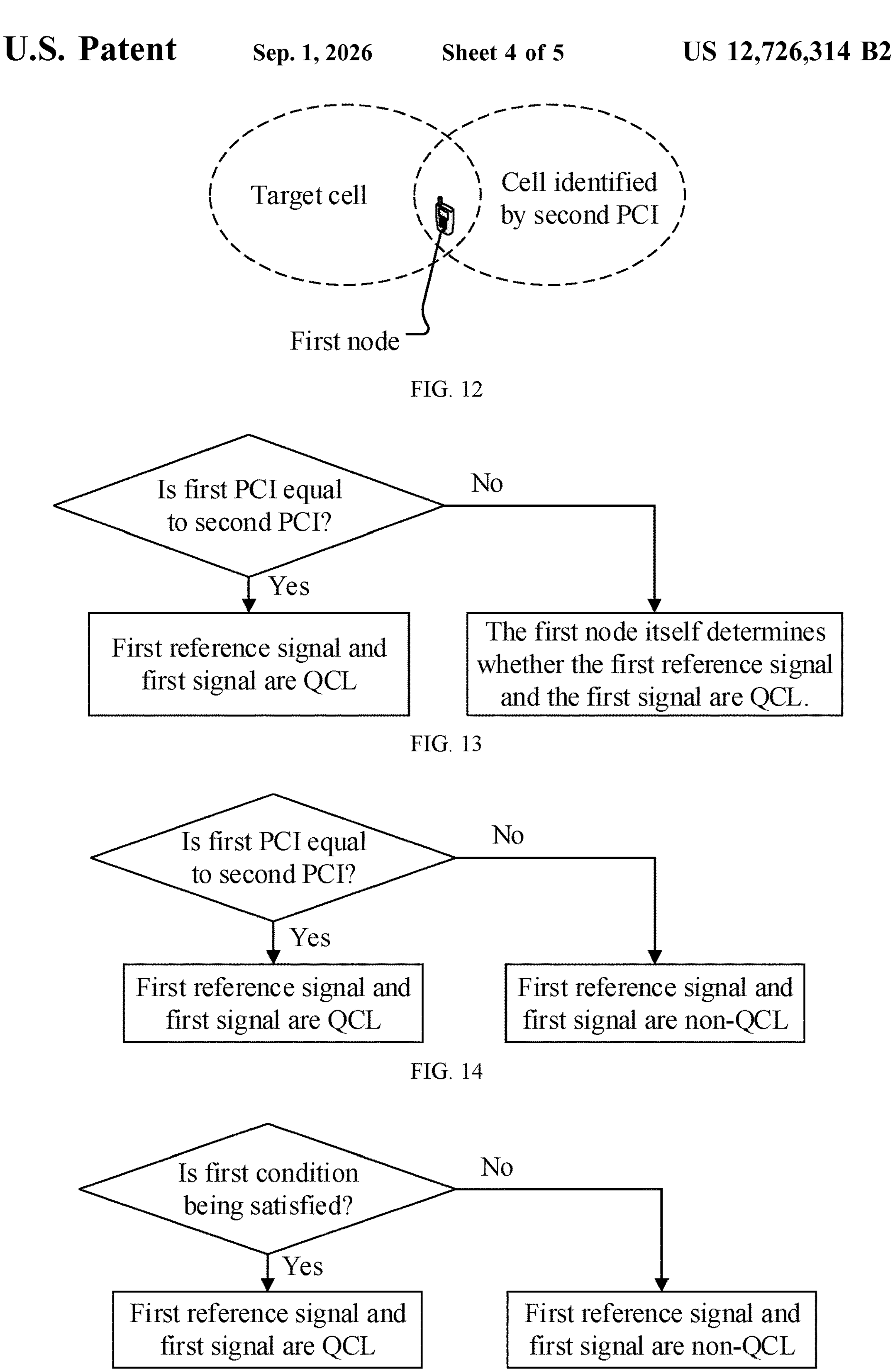
Target cell
Cell identified by second PCI
First node
FIG. 12
Is first PCI equal to second PCI?
No
Yes
First reference signal and first signal are QCL
The first node itself determines whether the first reference signal and the first signal are QCL.
FIG. 13
Is first PCI equal to second PCI?
No
Yes
First reference signal and first signal are QCL
First reference signal and first signal are non-QCL
FIG. 14
Is first condition being satisfied?
No
Yes
First reference signal and first signal are QCL
First reference signal and first signal are non-QCL
FIG. 15

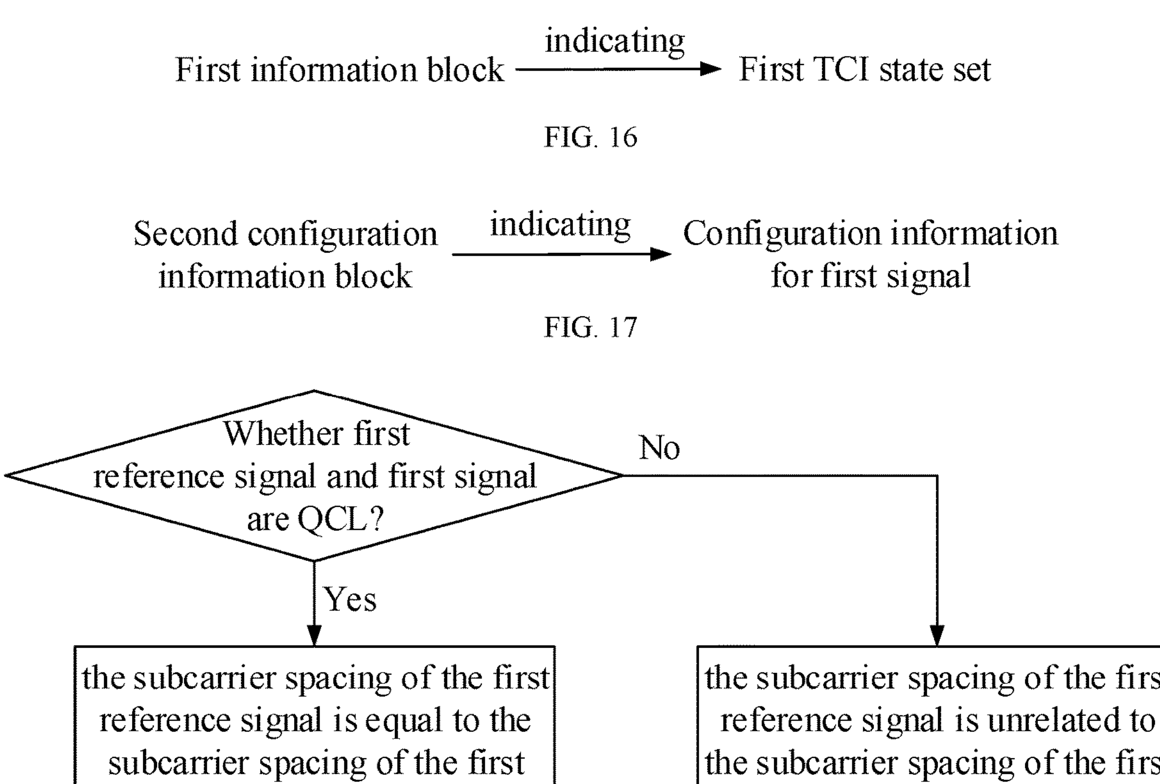
FIG. 16
FIG. 17
FIG. 18
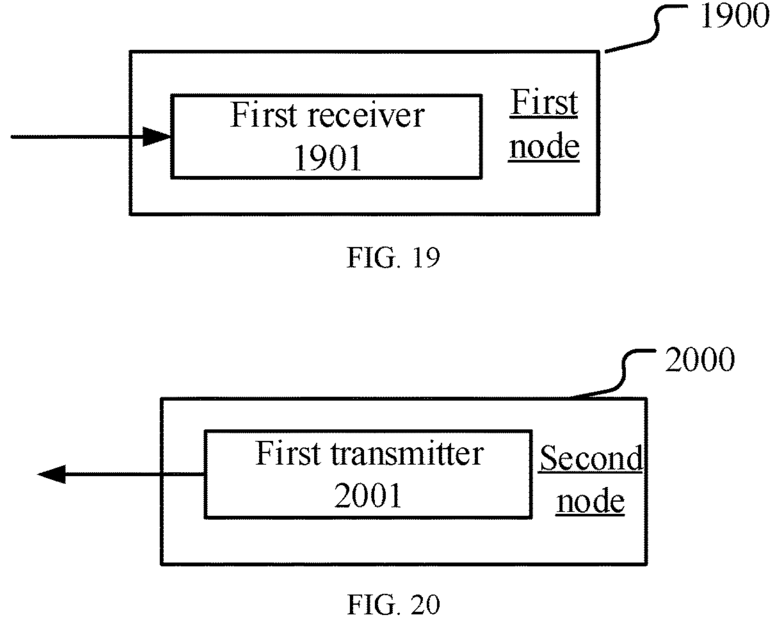
FIG. 19
FIG. 20

METHOD AND DEVICE FOR WIRELESS REFERENCE SIGNAL PROCESSING

CROSS REFERENCE TO RELATED APPLICATIONS

This application is the continuation of an international patent application No. PCT/CN2022/124568, filed on Oct. 11, 2022, which claims the priority benefit of Chinese Patent Application No. 202111237933.9, filed on Oct. 23, 2021, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

In a Long-term Evolution (LTE) system, the traditional Network Controlled mobility includes cell level mobility and beam level mobility, where cell level mobility is dependent on Radio Resource Control (RRC) signaling and beam level mobility does not involve RRC signaling. Prior to the 3rd Generation Partnership Project (3GPP) Release 16 (R16), beam-level mobility was only available for beam management within a single cell. The 3GPP Radio Access Network (RAN) #80 meeting decided to carry out researches on L1/L2-centric inter-cell mobility/beam management and inter-cell multi-Transmit/Receive Point (multi-TRP).

SUMMARY

In the discussion of L1/L2-centric inter-cell mobility and inter-cell multi-TRP, the network configures the UE (i.e., User Equipment) with at least one additional cell, and the UE can utilize the better link quality of the additional cell for transmission. In this scenario, when the UE's downlink physical layer channel or signal (e.g., but not limited to CSI-RS) overlaps with the synchronization signal of the additional cell in the time domain, what QCL (Quasi Co-Location) relationship the UE uses to receive the downlink physical layer channel or signal is an issue to be addressed.

To address the above problem, the present application provides a solution. It should be noted that while the above description uses cellular networks as an example, the present application is also applicable to other scenarios such as Sidelink transmission and achieves similar technical results as in cellular networks. Additionally, the adoption of a unified solution for various scenarios, including but not limited to cellular networks and sidelink transmission, contributes to the reduction of hardcore complexity and costs. In the case of no conflict, the embodiments of a first node and the characteristics in the embodiments may be applied to a second node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first configuration information block, the first configuration information block being used to determine configuration information for a first reference signal, the configuration information for the first reference signal including a first TCI state, the first TCI state indicating a second reference signal; and receiving the first reference signal and a first signal, the configuration information for the first reference signal being used to determine a first PCI, the first signal indicating a second PCI, and the first signal including a synchronization signal;

herein, the first reference signal and the first signal are overlapping in time domain; the second PCI is not equal to a PCI of a target cell, the target cell being a serving cell of the first node; whether the first reference signal and the first signal are quasi co-located is related to whether the first PCI and the second PCI are equal; when the first PCI is equal to the second PCI, the first reference signal and the first signal are quasi co-located.

In one embodiment, the problem to be solved by the present application comprises: what QCL relationship is used by a UE to receive a downlink physical layer signal when the downlink physical layer signal overlaps with a synchronization signal of an additional cell in time domain. The above method solves this problem by determining whether the downlink physical layer signal is quasi-co-located with the synchronization signal of the additional cell based on the relationship between the additional cell and a cell with which the downlink physical layer signal is associated via the QCL relationship.

In one embodiment, characteristics of the above method include: the first signal comprises a synchronization signal of an additional cell of the first node; whether or not the first reference signal is associated with the same additional cell through a QCL relationship is used to determine whether or not the first reference signal and the first signal are quasi co-located when overlapping with each other in the time domain.

In one embodiment, an advantage of the above method includes that the first node may flexibly choose to prioritize the reception of the reference signal of the serving cell or the synchronization signal of the additional cell according to specific demand.

In one embodiment, an advantage of the above method includes that when the first reference signal is associated with an additional cell through a QCL relationship, the first node needs to monitor a synchronization signal in that additional cell in order to correctly receive the first reference signal, and the above method ensures that in this case the first node prioritizes the reception of the synchronization signal from the additional cell.

According to one aspect of the present application, characterized in that when the first PCI is not equal to the second PCI, the first node itself determines whether the first reference signal and the first signal are quasi co-located.

According to one aspect of the present application, characterized in that when the first PCI is not equal to the second PCI, the first reference signal and the first signal are non-quasi co-located.

According to one aspect of the present application, characterized in that whether a first condition is satisfied is used to determine whether the first reference signal and the first signal are quasi co-located; the first condition includes that there is a PCI in a first PCI set that is equal to the second PCI; a first TCI state set is used to determine the first PCI set, the first TCI state set being configurable; the first TCI state belongs to the first TCI state set.

In one embodiment, an advantage of the above method includes that when the (active) TCI state or a currently used TCI state of the first node is associated with an additional cell through a QCL relationship, the first node needs to monitor the synchronization signal in the additional cell in order to accurately determine the corresponding spatial domain filter for each TCI state. The above method ensures that in this case, the first node receives the synchronization signal of the additional cell with priority.

According to one aspect of the present application, characterized in comprising:

receiving a first information block;

herein, the first information block indicates the first TCI state set.

According to one aspect of the present application, characterized in comprising:

receiving a second configuration information block;

herein, the second configuration information block indicates configuration information for the first signal.

According to one aspect of the present application, characterized in that whether the first reference signal and the first signal are quasi co-located is used to determine a subcarrier spacing (SCS) of the first reference signal; when the first reference signal and the first signal are quasi co-located, the SCS of the first reference signal is equal to an SCS of the first signal.

According to one aspect of the present application, the first node comprises a UE.

According to one aspect of the present application, the first node comprises a relay node.

The present application provides a method in a second node for wireless communications, comprising:

transmitting a first configuration information block, the first configuration information block being used to determine configuration information for a first reference signal, the configuration information for the first reference signal including a first TCI state, the first TCI state indicating a second reference signal;

herein, the first reference signal and a first signal are overlapping in time domain; the configuration information for the first reference signal is used to determine a first PCI, and the first signal indicates a second PCI, the first signal including a synchronization signal; the second PCI is not equal to a PCI of a target cell, the target cell being a serving cell of a target receiver of the first configuration information block; whether the first reference signal and the first signal are quasi co-located is related to whether the first PCI and the second PCI are equal; when the first PCI is equal to the second PCI, the first reference signal and the first signal are quasi co-located.

According to one aspect of the present application, characterized in that when the first PCI is not equal to the second PCI, the target receiver of the first configuration information block itself determines whether the first reference signal and the first signal are quasi co-located.

According to one aspect of the present application, characterized in that when the first PCI is not equal to the second PCI, the first reference signal and the first signal are non-quasi co-located.

According to one aspect of the present application, characterized in that whether a first condition is satisfied is used to determine whether the first reference signal and the first signal are quasi co-located; the first condition includes that there is a PCI in a first PCI set that is equal to the second PCI; a first TCI state set is used to determine the first PCI set, the first TCI state set being configurable; the first TCI state belongs to the first TCI state set.

According to one aspect of the present application, characterized in comprising:

transmitting a first information block;

herein, the first information block indicates the first TCI state set.

According to one aspect of the present application, characterized in comprising:

transmitting a second configuration information block;

herein, the second configuration information block indicates configuration information for the first signal.

According to one aspect of the present application, characterized in that whether the first reference signal and the first signal are quasi co-located is used to determine a subcarrier spacing (SCS) of the first reference signal; when the first reference signal and the first signal are quasi co-located, the SCS of the first reference signal is equal to an SCS of the first signal.

According to one aspect of the present application, the second node comprises a base station.

According to one aspect of the present application, the second node comprises a TRP.

According to one aspect of the present application, the second node comprises a relay node.

According to one aspect of the present application, the second node comprises a Centralized Unit (CU).

According to one aspect of the present application, the second node comprises a Distributed Unit (DU).

The present application provides a first node for wireless communications, comprising:

a first receiver, receiving a first configuration information block, the first configuration information block being used to determine configuration information for a first reference signal, the configuration information for the first reference signal including a first TCI state, the first TCI state indicating a second reference signal;

the first receiver, receiving the first reference signal and a first signal, the configuration information for the first reference signal being used to determine a first PCI, the first signal indicating a second PCI, and the first signal including a synchronization signal;

herein, the first reference signal and the first signal are overlapping in time domain; the second PCI is not equal to a PCI of a target cell, the target cell being a serving cell of the first node; whether the first reference signal and the first signal are quasi co-located is related to whether the first PCI and the second PCI are equal; when the first PCI is equal to the second PCI, the first reference signal and the first signal are quasi co-located.

The present application provides a second node for wireless communications, comprising:

a first transmitter, transmitting a first configuration information block, the first configuration information block being used to determine configuration information for a first reference signal, the configuration information for the first reference signal including a first TCI state, the first TCI state indicating a second reference signal;

herein, the first reference signal and a first signal are overlapping in time domain; the configuration information for the first reference signal is used to determine a first PCI, and the first signal indicates a second PCI, the first signal including a synchronization signal; the second PCI is not equal to a PCI of a target cell, the target cell being a serving cell of a target receiver of the first configuration information block; whether the first reference signal and the first signal are quasi co-located is related to whether the first PCI and the second PCI are equal; when the first PCI is equal to the second PCI, the first reference signal and the first signal are quasi co-located.

In one embodiment, compared with the prior art, the present application is advantageous in the following aspects:

The first node may flexibly choose to prioritize the reception of the reference signal of the serving cell or the synchronization signal of the additional cell according to the demand.

BRIEF DESCRIPTION OF THE DRAWINGS

Other features, objects and advantages of the present application will become more apparent from the detailed description of non-restrictive embodiments taken in conjunction with the following drawings:

FIG. 12 illustrates a schematic diagram of a target cell and a cell identified by a second PCI according to one embodiment of the present application.

FIG. 13 illustrates a schematic diagram of whether a first reference signal and a first signal are quasi co-located according to one embodiment of the present application.

FIG. 14 illustrates a schematic diagram of whether a first reference signal and a first signal are quasi co-located according to one embodiment of the present application.

FIG. 15 illustrates a schematic diagram of whether a first reference signal and a first signal are quasi co-located according to one embodiment of the present application.

FIG. 16 illustrates a schematic diagram of a first information block indicating a first TCI state set according to one embodiment of the present application.

FIG. 17 illustrates a schematic diagram of a second configuration information block indicating configuration information for a first signal according to one embodiment of the present application.

FIG. 18 illustrates a schematic diagram of a relationship between the subcarrier spacing of a first reference signal and the subcarrier spacing of a first signal according to one embodiment of the present application.

FIG. 19 illustrates a structure block diagram of a processing device used in a first node according to one embodiment of the present application.

FIG. 20 illustrates a structure block diagram of a processing device used in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
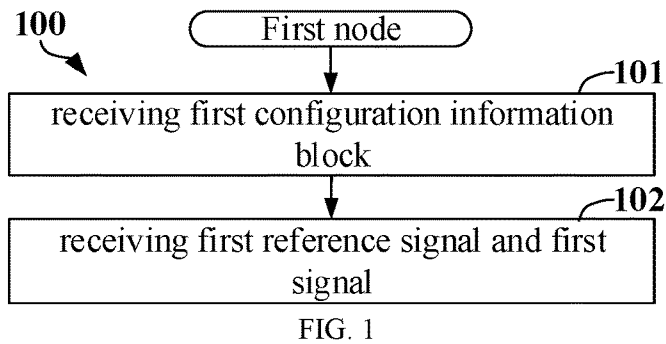
FIG. 1 illustrates a flowchart of a first configuration information block, a first reference signal and a first signal according to one embodiment of the present application.

Embodiment 1 illustrates a flowchart of a first configuration information block, a first reference signal and a first signal according to one embodiment of the present application, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present application receives a first configuration information block in step 101; and receives a first reference signal and a first signal in step 102. Herein, the first configuration information block is used to determine configuration information for the first reference signal, the configuration information for the first reference signal including a first TCI state, the first TCI state indicating a second reference signal; the configuration information for the first reference signal is used to determine a first PCI, and the first signal indicates a second PCI, the first signal including a synchronization signal; the first reference signal and the first signal are overlapping in time domain; the second PCI is not equal to a PCI of a target cell, the target cell being a serving cell of the first node; whether the first reference signal and the first signal are quasi co-located is related to whether the first PCI and the second PCI are equal; when the first PCI is equal to the second PCI, the first reference signal and the first signal are quasi co-located.

In one embodiment, the first configuration information block is carried by a higher layer signaling.

In one embodiment, the first configuration information block is carried by an RRC signaling.

In one embodiment, the first configuration information block is carried by a Medium Access Control layer Control Element (MAC CE).

In one embodiment, the first configuration information block is carried by an RRC signaling and a MAC CE together.

In one embodiment, the first configuration information block comprises information in at least one Information Element (IE).

In one embodiment, the first configuration information block comprises information in at least one MAC CE.

In one embodiment, the first configuration information block comprises information in at least one IE and information in at least one MAC CE.

In one embodiment, the first configuration information block comprises information in a first IE.

In one embodiment, the first configuration information block comprises information in a first IE and a first MAC CE.

In one embodiment, the first configuration information block comprises information in a first IE and a second IE.

In one embodiment, a name of the first IE includes "CSI".

In one embodiment, a name of the first IE includes "CSI-ReportConfig".

In one embodiment, a name of the first IE includes "CSI-ResourceConfig".

In one embodiment, a name of the first IE includes "NZP-CSI-RS-ResourceSet".

In one embodiment, a name of the first IE includes "NZP-CSI-RS-Resource".

In one embodiment, a name of the first IE includes "CSI-AperiodicTriggerState".

In one embodiment, a name of the first MAC CE includes "SP CSI-RS/CSI-IM Resource Set Activation/Deactivation".

In one embodiment, a name of the second IE includes "CSI-AperiodicTriggerState".

In one embodiment, the first reference signal comprises a Channel State Information-Reference Signal (CSI-RS).

In one embodiment, the first reference signal comprise a Non-Zero-Power (NZP) CSI-RS.

In one embodiment, the first reference signal is a CSI-RS.

In one embodiment, the first reference signal is an NZP CSI-RS.

In one embodiment, the first reference signal comprises DeModulation Reference Signals (DMRS).

In one embodiment, the first reference signal comprises a Phase-Tracking Reference Signal (PTRS).

In one embodiment, the first reference signal comprises a Remote Interference Management (RIM) RS.

In one embodiment, the first signal comprises a Positioning Reference Signal (PRS).

In one embodiment, the reference signal comprises a CSI-RS port.

In one embodiment, the reference signal comprises an antenna port.

In one embodiment, the reference signal comprises a reference signal port.

In one embodiment, the first reference signal comprises at least one reference signal port.

In one embodiment, the at least one reference signal port comprised in the first reference signal includes a CSI-RS port.

In one embodiment, the first reference signal is periodic.

In one embodiment, the first reference signal is semi-persistent.

In one embodiment, the first reference signal is aperiodic.

In one embodiment, the first reference signal is identified by an NZP-CSI-RS-ResourceId.

In one embodiment, the identifier of the first reference signal is an NZP-CSI-RS-ResourceId.

In one embodiment, the configuration information for the first reference signal includes some or all of a time-domain resource, a frequency-domain resource, a Code Division Multiplexing (CDM) type, a CDM group, an RS sequence, scrambling, periodicity, a slot offset, a QCL relationship, a Transmission Configuration Indicator (TCI) state, density, or a number of reference signal ports.

In one embodiment, the first reference signal is transmitted in a first reference signal resource, the first reference signal resource comprising a CSI-RS resource.

In one embodiment, the first reference signal resource is an NZP CSI-RS resource.

In one embodiment, the first reference signal is transmitted in accordance with configuration information for the first reference signal resource.

In one embodiment, the first reference signal is transmitted in one occurrence of the first reference signal resource in time domain.

In one embodiment, the first reference signal is a reference signal transmission according to configuration information for the first reference signal resource.

In one embodiment, the configuration information for the first reference signal is configuration information for the first reference signal resource.

In one embodiment, the configuration information for the first reference signal resource includes some or all of a time-domain resource, a frequency-domain resource, a CDM type, a CDM group, an RS sequence, scrambling, periodicity, a slot offset, a QCL relationship, a TCI state, density, or a number of CSI-RS ports.

In one embodiment, the first reference signal resource is periodic.

In one embodiment, the first reference signal resource is semi-persistent.

In one embodiment, the first reference signal resource is aperiodic.

In one embodiment, the first reference signal resource is identified by an NZP-CSI-RS-ResourceId.

In one embodiment, the identifier of the first reference signal resource is an NZP-CSI-RS-ResourceId.

In one embodiment, an identifier of the first reference signal is an identifier of the first reference signal resource.

In one embodiment, the first configuration information block indicates the configuration information for the first reference signal.

In one embodiment, the first configuration information block explicitly indicates the configuration information for the first reference signal.

In one embodiment, the first configuration information block implicitly indicates the configuration information for the first reference signal.

In one embodiment, the first configuration information block explicitly indicates a part of the configuration information for the first reference signal and implicitly indicates the other part of the configuration information for the first reference signal.

In one embodiment, the explicit indicating includes indicating by means of a value of a bit field.

In one embodiment, the implicit indicating includes indirectly indicating by means of indication of other IE(s) comprising all or part of configuration information for the first reference signal.

In one embodiment, the first configuration information block indicates only partial configuration information in the configuration information for the first reference signal.

In one embodiment, the first configuration information block indicates all configuration information in the configuration information for the first reference signal.

In one embodiment, the first configuration information block indicates portions of the configuration information for the first reference signal other than the QCL relationship and TCI state.

In one embodiment, the first configuration information block indicates only the QCL relationship in the configuration information for the first reference signal.

In one embodiment, the first configuration information block indicates only the TCI state in the configuration information for the first reference signal.

In one embodiment, the first TCI state is used to determine a QCL relationship of the first reference signal.

In one embodiment, a TCI state of the first reference signal is the first TCI state.

In one embodiment, the first TCI state is used to determine a QCL relationship of the first reference signal resource.

In one embodiment, a TCI state of the first reference signal resource is the first TCI state.

In one embodiment, the first TCI state is used to configure a QCL relationship between the first reference signal and the second reference signal.

In one embodiment, the first TCI state is used to configure a QCL relationship between a reference signal port of the first reference signal and the second reference signal.

In one embodiment, the first TCI state is used to configure a QCL relationship between a CSI-RS port of the first reference signal resource and the second reference signal.

In one embodiment, the first configuration information block indicates the first TCI state.

In one embodiment, the first configuration information block indicates a corresponding TCI state identifier for the first TCI state.

In one embodiment, the first configuration information block indicates that a TCI state of the first reference signal is the first TCI state.

In one embodiment, the first configuration information block indicates that a TCI state of the first reference signal resource is the first TCI state.

In one embodiment, the PCI refers to: a Physical Cell Identifier.

In one embodiment, the PCI refers to: a Physical Cell Identity.

In one embodiment, the PCI refers to: a Physical-layer Cell Identity.

In one embodiment, the PCI refers to: a PhysCellId.

In one embodiment, the first PCI is a non-negative integer.

In one embodiment, the first PCI is a non-negative integer no greater than 1007.

In one embodiment, the first PCI is equal to the second PCI or the PCI of the target cell.

In one embodiment, the first PCI is neither equal to the second PCI nor to the PCI of the target cell.

In one embodiment, the first reference signal is transmitted in a cell identified by the first PCI.

In one embodiment, the first PCI is used to generate the first reference signal.

In one embodiment, the first PCI is used to generate an RS sequence of the first reference signal.

In one embodiment, the first PCI is equal to the PCI of the target cell.

In one embodiment, the first PCI is not equal to the PCI of the target cell.

In one embodiment, the first PCI is equal to the PCI of the target cell, the first reference signal being transmitted in the target cell.

In one embodiment, the first PCI is not equal to the PCI of the target cell, the first reference signal being transmitted in a cell different from the target cell.

In one embodiment, the meaning of the sentence that the configuration information for the first reference signal is used to determine a first PCI includes: the configuration information for the first reference signal includes the first PCI.

In one embodiment, the meaning of the sentence that the configuration information for the first reference signal is used to determine a first PCI includes: a QCL relationship of the first reference signal is used to determine the first PCI.

In one embodiment, the meaning of the sentence that the configuration information for the first reference signal is used to determine a first PCI includes: a TCI state of the first reference signal is used to determine the first PCI.

In one embodiment, the first configuration information block is used to determine the first PCI.

In one embodiment, the first TCI state is used to determine the first PCI.

In one embodiment, the first TCI state indicates a reference signal identifier of the second reference signal.

In one embodiment, the first TCI state indicates a QCL type corresponding to the second reference signal.

In one embodiment, the second reference signal comprises a CSI-RS.

In one embodiment, the second reference signal comprises a Synchronization Signal (SS)/Physical Broadcast Channel (PBCH) Block.

In one embodiment, a reference signal identifier of the second reference signal includes NZP-CSI-RS-ResourceId.

In one embodiment, a reference signal identifier of the second reference signal includes SS/PBCH Block-Index.

In one embodiment, the second reference signal is periodic.

In one embodiment, the second reference signal is semi-persistent.

In one embodiment, the second reference signal is aperiodic.

In one embodiment, the second reference signal is quasi co-located with an SS/PBCH Block of a cell identified by the first PCI.

In one embodiment, the second reference signal is quasi co-located with a third reference signal, the third reference signal being quasi co-located with an SS/PBCH Block of a cell identified by the first PCI.

In one embodiment, a TCI state of the second reference signal indicates an SS/PBCH Block of a cell identified by the first PCI.

In one embodiment, a TCI state of the second reference signal indicates a third reference signal, the third reference signal being quasi co-located with one SS/PBCH Block of a cell identified by the first PCI.

In one embodiment, the third reference signal comprises a CSI-RS.

In one embodiment, the second reference signal is transmitted in a cell identified by the first PCI.

In one embodiment, the first reference signal and the second reference signal belong to a same Bandwidth Part (BWP).

In one embodiment, the first reference signal and the second reference signal belong to a same carrier.

In one embodiment, the first reference signal and the second reference signal belong to a same cell.

In one embodiment, the first reference signal and the second reference signal belong to different BWPs.

In one embodiment, the first reference signal and the second reference signal belong to different carriers.

In one embodiment, the first signal comprises a baseband signal.

In one embodiment, the first signal comprises a radio signal.

In one embodiment, the first signal comprises a radio frequency signal.

In one embodiment, the first signal comprises an SS/PBCH Block.

In one embodiment, the first signal is an SS/PBCH Block.

In one embodiment, the first signal comprises a Primary Synchronization Signal (PSS), a Secondary Synchronization Signal (SSS) and a PBCH.

In one embodiment, the first signal comprises a PSS, a SSS, a PBCH and DMRS of the PBCH.

In one embodiment, the first signal comprises a PSS, a SSS and a Master Information Block (MIB).

In one embodiment, the first signal occurs periodically in time domain.

In one embodiment, the first signal occurs multiple times in time domain.

In one embodiment, the first signal occurs only once in time domain.

In one embodiment, the first signal corresponds to an SS/PBCH Block index.

In one embodiment, the first reference signal and the first signal belong to a same BWP.

In one embodiment, the first reference signal and the first signal belong to a same Carrier.

In one embodiment, the first reference signal and the first signal belong to different BWPs.

In one embodiment, the first reference signal and the first signal belong to different carriers.

In one embodiment, the first reference signal and the first signal belong to a same cell.

In one embodiment, the first reference signal and the first signal belong to different cells.

In one embodiment, a channel occupied by the first signal includes a PBCH.

In one embodiment, the second PCI is a non-negative integer.

In one embodiment, the second PCI is a non-negative integer no greater than 1007.

In one embodiment, a transmitter of the first signal is a cell identified by the second PCI.

In one embodiment, the first PCI is equal to the second PCI.

In one embodiment, the first PCI is not equal to the second PCI.

In one embodiment, the first PCI is equal to the second PCI, the first reference signal and the first signal being transmitted in a same cell.

In one embodiment, the first PCI is not equal to the second PCI, the first reference signal and the first signal being transmitted in different cells.

In one embodiment, an SS sequence comprised in the first signal indicates the second PCI.

In one embodiment, a PSS sequence and a SSS sequence comprised in the first signal together indicate the second PCI.

In one embodiment, a PSS sequence comprised in the first signal indicates the second PCI.

In one embodiment, a SSS sequence comprised in the first signal indicates the second PCI.

In one embodiment, the first node is capable to obtain the second PCI without doubt from an SS sequence of the first signal.

In one embodiment, the second PCI is used to generate an SS sequence included in the first signal.

In one embodiment, the first reference signal and the first signal occupy the same one or more symbols.

In one embodiment, the first reference signal is configured to occupy the same one or more symbols as the first signal.

In one embodiment, the first reference signal resource is configured to occupy the same one or more symbols as the first signal.

In one embodiment, one or more symbols with which the first reference signal is configured is/are occupied by the first signal.

In one embodiment, one or more symbols with which the first reference signal resource is configured is/are occupied by the first signal.

In one embodiment, all symbols occupied by the first reference signal are occupied by the first signal.

In one embodiment, at least one symbol occupied by the first reference signal is not occupied by the first signal.

In one embodiment, at least one occurrence of the first reference signal resource in time domain and the first signal occupy mutually orthogonal time resources.

In one subembodiment, the first reference signal and any of the at least one occurrence are orthogonal to each other in time domain.

In one embodiment, the symbol is an Orthogonal Frequency Division Multiplexing (OFDM) Symbol.

In one embodiment, the symbol is obtained by an output by transform precoding through OFDM Symbol Generation.

In one embodiment, the QCL refers to being Quasi-Co-Located.

In one embodiment, the second reference signal and the first signal are non-quasi co-located.

In one embodiment, the second reference signal and the first signal are quasi co-located with QCL-TypeD.

In one embodiment, the first PCI is not equal to the second PCI, the second reference signal and the first signal being non-QCL.

In one embodiment, the first PCI is equal to the second PCI, the second reference signal and the first signal being QCL.

In one embodiment, the first PCI is equal to the second PCI, the second reference signal and the first signal being non-QCL.

In one embodiment, two signals being QCL means: the large-scale properties of a channel over which one of the two signals is conveyed can be inferred from the large-scale properties of a channel over which the other of the two signals is conveyed.

In one embodiment, the large-scale properties include one or more of a delay spread, a Doppler spread, a Doppler shift, an average delay or a Spatial Rx parameter.

In one embodiment, the meaning of the sentence that the first reference signal and the first signal are quasi co-located includes that: the first node assumes that the first reference signal and the first signal are quasi co-located.

In one embodiment, the meaning of the sentence that the first reference signal and the first signal are quasi co-located includes that: the first node may assume that the first reference signal and the first signal are quasi co-located.

In one embodiment, the meaning of the sentence that the first reference signal and the first signal are quasi co-located includes that: the transmitter of the first reference signal assumes that the first node assumes that the first reference signal and the first signal are quasi co-located.

In one embodiment, the meaning of the sentence that the first reference signal and the first signal are quasi co-located includes that: the first node receives the first reference signal and the first signal with a same spatial domain filter.

In one embodiment, the meaning of the sentence that the first reference signal and the first signal are quasi co-located includes that: the transmitter of the first reference signal assumes that the first node receives the first reference signal and the first signal with a same spatial domain filter.

In one embodiment, the meaning of the sentence that the first reference signal and the first signal are quasi co-located includes that: the first node can infer a spatial reception parameter of the first reference signal from a spatial reception parameter of the first signal.

In one embodiment, when the first PCI is equal to the second PCI, both the first reference signal and the first signal are transmitted in a cell identified by the second PCI; when the first PCI is not equal to the second PCI, the first reference signal and the first signal are transmitted in separate cells.

In one embodiment, if the first PCI is equal to the second PCI, the first reference signal and the first signal are quasi co-located.

In one embodiment, when the first PCI is equal to the second PCI, the first reference signal and the first signal are quasi co-located with QCL-TypeD.

In one embodiment, when the first PCI is equal to the second PCI, the first reference signal and the first signal are quasi co-located with one of QCL-TypeA, QCL-TypeB, QCL-TypeC or QCL-TypeD.

In one embodiment, when the first PCI is equal to the second PCI, the first reference signal and the first signal are quasi co-located with the corresponding QCL type including one of QCL-TypeA, QCL-TypeB, or QCL-TypeC and QCL-TypeD.

In one embodiment, when the first reference signal and the first signal are quasi co-located, a QCL type corresponding to the first reference signal and the first signal is QCL-TypeD.

In one embodiment, when the first reference signal and the first signal are quasi co-located, a QCL type corresponding to the first reference signal and the first signal is one of QCL-TypeA, QCL-TypeB, QCL-TypeC or QCL-TypeD.

In one embodiment, when the first reference signal and the first signal are quasi co-located, a QCL type corresponding to the first reference signal and the first signal includes one of QCL-TypeA, QCL-TypeB or QCL-TypeC and QCL-TypeD.

In one embodiment, when the first reference signal and the first signal are non-quasi co-located, the first reference signal and the second reference signal are quasi co-located.

In one subembodiment, the first node assumes that the first reference signal and the second reference signal are quasi co-located.

In one subembodiment, a QCL type corresponding to the first reference signal and the second reference signal is QCL-TypeD.

In one subembodiment, a QCL type corresponding to the first reference signal and the second reference signal is one of QCL-TypeA, QCL-TypeB, QCL-TypeC or QCL-TypeD.

In one subembodiment, a QCL type corresponding to the first reference signal and the second reference signal includes one of QCL-TypeA, QCL-TypeB or QCL-TypeC and QCL-TypeD.

In one embodiment, a subcarrier spacing of the first reference signal is equal to a subcarrier spacing of the first signal.

In one embodiment, a subcarrier spacing of the first reference signal is equal to a subcarrier spacing of a BWP to which the first reference signal belongs, and the subcarrier spacing of the BWP to which the first reference signal belongs is equal to a subcarrier spacing of the first signal.

Embodiment 2

Figure 2:
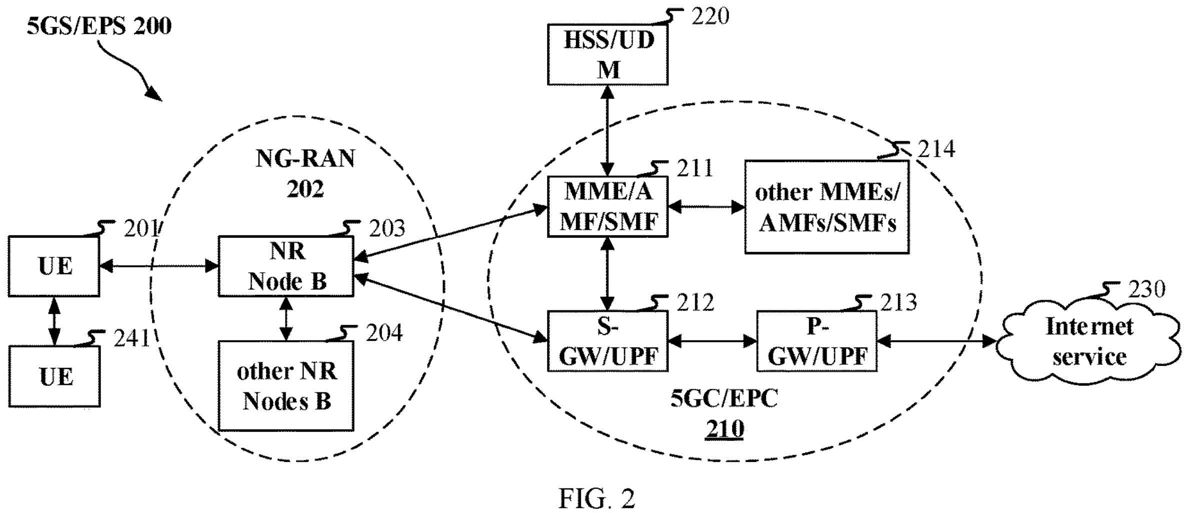
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture 200 of Long-Term Evolution (LTE), Long-Term Evolution Advanced (LTE-A) and future 5G systems. The network architecture 200 of the LTE, LTE-A and future 5G systems may be called an Evolved Packet System (EPS) 200. The 5G NR or LTE network architecture 200 may be called a 5G System/Evolved Packet System (5GS/EPS) 200 or other suitable terminology. The 5GS/EPS 200 may comprise one or more UEs 201, a UE 241 in sidelink communication with the UE(s) 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services. The NG-RAN 202 includes NR (New Radio) Node B (gNB) 203 and other gNB 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the second node in the present application includes the gNB 203.

In one embodiment, a radio link between the UE 201 and the gNB 203 is a cellular link.

In one embodiment, a transmitter of the first configuration information block includes the gNB 203.

In one embodiment, a receiver of the first configuration information block includes the UE 201.

In one embodiment, a transmitter of the first signal includes the gNB 203.

In one embodiment, a transmitter of the first signal includes the gNB 204.

In one embodiment, a receiver of the first signal includes the UE 201.

In one embodiment, a transmitter of the first reference signal includes the gNB 203.

In one embodiment, a transmitter of the first reference signal includes the gNB 204.

In one embodiment, a receiver of the first reference signal includes the UE 201.

In one embodiment, the UE 201 supports L1/L2-centric inter-cell mobility.

In one embodiment, the UE 201 supports L1/L2 mobility between the target cell and the cell identified by the second PCI.

In one embodiment, the UE 201 supports beam level mobility between the target cell and the cell identified by the second PCI.

In one embodiment, the UE 201 supports beam management between the target cell and the cell identified by the second PCI.

In one embodiment, the UE 201 supports L1/L2 beam management between the target cell and the cell identified by the second PCI.

In one embodiment, the UE 201 supports inter-cell multi-TRP.

Embodiment 3

Figure 3:
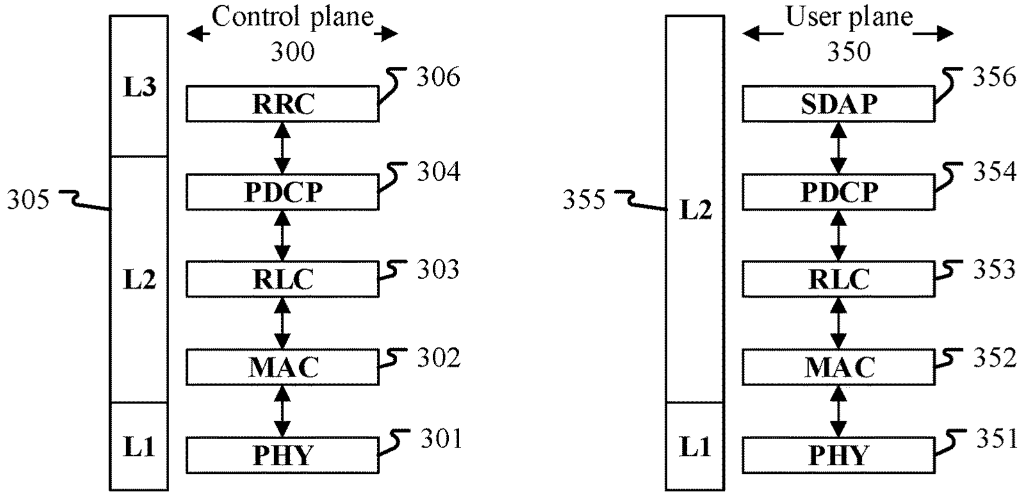
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first communication node and a second communication node as well as between two UEs. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first configuration information block is generated by the RRC sublayer 306.

In one embodiment, the first configuration information block is generated by the MAC sublayer 302 or the MAC sublayer 352.

In one embodiment, the first signal is generated by the PHY 301, or the PHY 351.

In one embodiment, the first reference signal is generated by the PHY 301, or the PHY 351.

In one embodiment, the second reference signal is generated by the PHY 301, or the PHY 351.

In one embodiment, the first information block is generated by the RRC sublayer 306.

In one embodiment, the second configuration information block is generated by the RRC sublayer 306.

Embodiment 4

Figure 4:
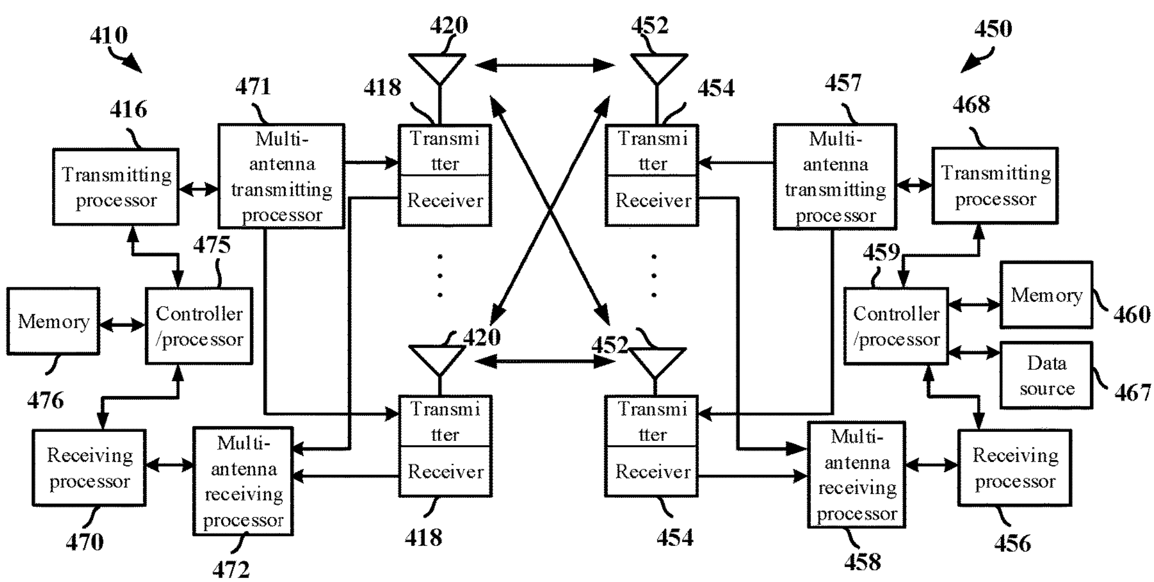
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with the memory 460 that stores program code and data; the memory 460 may be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 firstly converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 may be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives the first configuration information block; and receives the first reference signal and the first signal.

In one embodiment, the second communication device 450 comprises a memory that stores a computer readable instruction program. The computer readable instruction program generates actions when executed by at least one processor. The actions include: receiving the first configuration information block; and receiving the first reference signal and the first signal.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits the first configuration information block.

In one embodiment, the first communication device 410 comprises a memory that stores a computer readable instruction program. The computer readable instruction program generates actions when executed by at least one processor. The actions include: transmitting the first configuration information block.

In one embodiment, the first node in the present application comprises the second communication device 450.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first configuration information block; at least one of the antenna 420, the transmitter 418, the transmitting processor 416, the multi-antenna transmitting processor 471, the controller/processor 475 or the memory 476 is used to transmit the first configuration information block.

In one embodiment, at least one of the antenna 452, the receiver 454, the receiving processor 456, the multi-antenna receiving processor 458, the controller/processor 459, the memory 460 or the data source 467 is used to receive the first reference signal; at least one of the antenna 420, the transmitter 418, the transmitting processor 416, the multi-antenna transmitting processor 471, the controller/processor 475 or the memory 476 is used to transmit the first reference signal.

In one embodiment, at least one of the antenna 452, the receiver 454, the receiving processor 456, the multi-antenna receiving processor 458, the controller/processor 459, the memory 460 or the data source 467 is used to receive the first signal; at least one of the antenna 420, the transmitter 418, the transmitting processor 416, the multi-antenna transmitting processor 471, the controller/processor 475 or the memory 476 is used to transmit the first signal.

In one embodiment, at least one of the antenna 452, the receiver 454, the receiving processor 456, the multi-antenna receiving processor 458, the controller/processor 459, the memory 460 or the data source 467 is used to receive the first information block; at least one of the antenna 420, the transmitter 418, the transmitting processor 416, the multi-antenna transmitting processor 471, the controller/processor 475 or the memory 476 is used to transmit the first information block.

In one embodiment, at least one of the antenna 452, the receiver 454, the receiving processor 456, the multi-antenna receiving processor 458, the controller/processor 459, the memory 460 or the data source 467 is used to receive the second configuration information block; at least one of the antenna 420, the transmitter 418, the transmitting processor 416, the multi-antenna transmitting processor 471, the controller/processor 475 or the memory 476 is used to transmit the second configuration information block.

Embodiment 5

Figure 5:
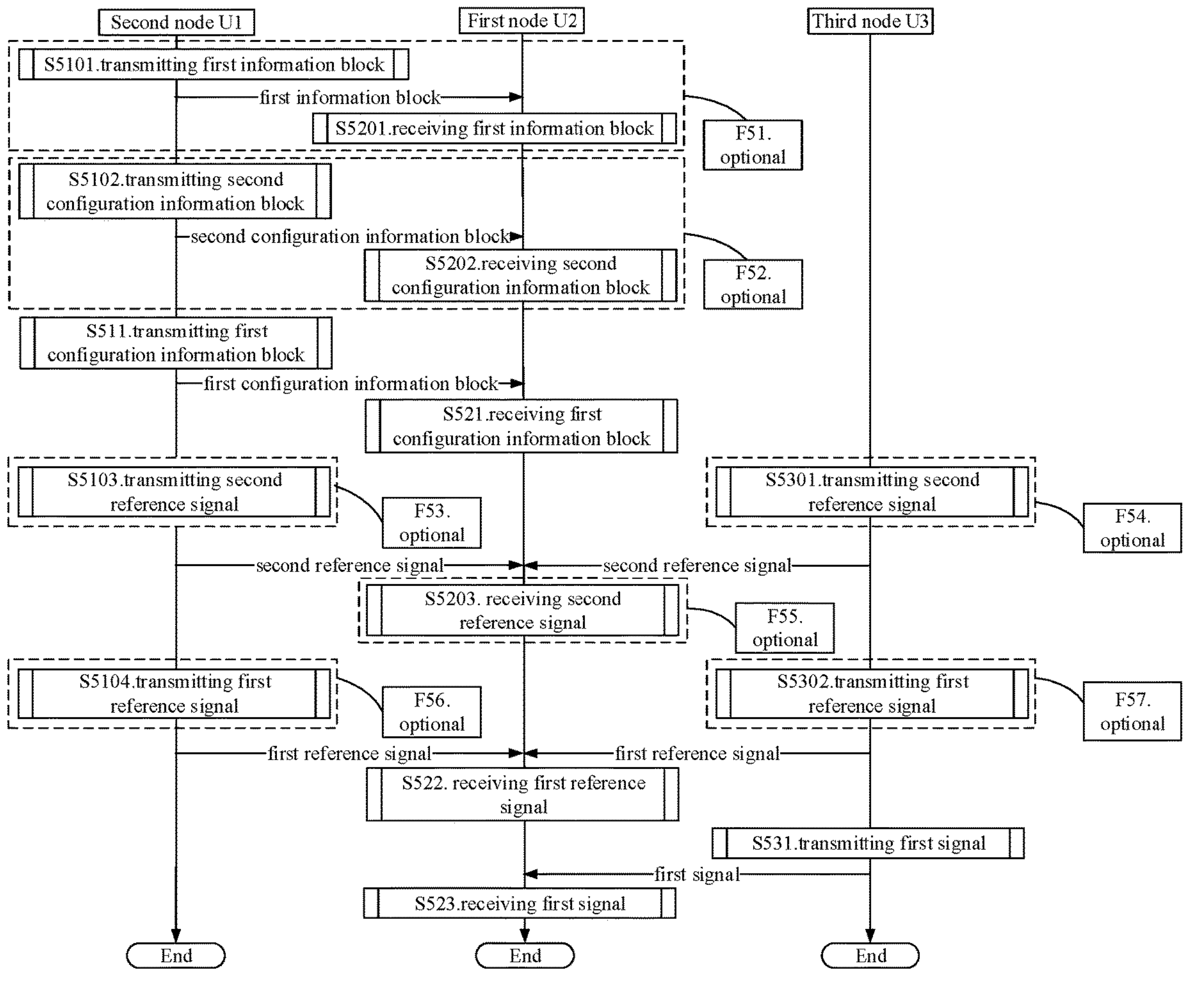
FIG. 5 illustrates a flowchart of transmission according to one embodiment of the present application.

Embodiment 5 illustrates a flowchart of wireless transmission according to one embodiment of the present application, as shown in FIG. 5. In FIG. 5, a second node U1, a first node U2 and a third node U3 are communication nodes that transmit via an air interface, respectively. In FIG. 5, steps marked by boxes F51 to F57 are optional, respectively.

The second node U1 transmits a first information block in step S5101; transmits a second configuration information block in step S5102; transmits a first configuration information block in step S511; transmits a second reference signal in step S5103; and transmits a first reference signal in step S5104.

The first node U2 receives a first information block in step S5201; receives a second configuration information block in step S5202; receives a first configuration information block in step S521; receives a second reference signal in step S5203; receives a first reference signal in step S522; and receives a first signal in step S523.

The third node U3 transmits a second reference signal in step S5301; transmits a first reference signal in step S5302; and transmits a first signal in step S531.

In Embodiment 5, the first configuration information block is used to determine configuration information for the first reference signal, the configuration information for the first reference signal including a first TCI state, the first TCI state indicating a second reference signal; the configuration information for the first reference signal is used by the first node U2 to determine a first PCI, and the first signal indicates a second PCI, the first signal including a synchronization signal; the first reference signal and the first signal are overlapping in time domain; the second PCI is not equal to a PCI of a target cell, the target cell being a serving cell of the first node; whether the first reference signal and the first signal are quasi co-located is related to whether the first PCI and the second PCI are equal; when the first PCI is equal to the second PCI, the first reference signal and the first signal are quasi co-located.

In one embodiment, the first node U2 is the first node in the present application.

In one embodiment, the second node U1 is the second node in the present application.

In one embodiment, an air interface between the second node U1 and the first node U2 includes a wireless interface between a base station and a UE.

In one embodiment, an air interface between the second node U1 and the first node U2 includes one or more of a wireless interface between TRP and UE, a wireless interface between CU and UE, or a wireless interface between DU and UE.

In one embodiment, an air interface between the third node U3 and the first node U2 includes a wireless interface between a base station and a UE.

In one embodiment, an air interface between the third node U3 and the first node U2 includes one or more of a wireless interface between TRP and UE, a wireless interface between CU and UE, or a wireless interface between DU and UE.

In one embodiment, the second node U1 comprises a maintenance base station for a serving cell of the first node U2.

In one embodiment, the second node U1 comprises a maintenance base station for the target cell.

In one embodiment, the second node U1 is a maintenance base station for a cell in a cell group to which the target cell belongs.

In one embodiment, the second node U1 is a maintenance base station for any cell in a cell group to which the target cell belongs.

In one embodiment, the second node U1 comprises a TRP in the target cell.

In one embodiment, the second node U1 comprises a DU in the target cell.

In one embodiment, the second node U1 comprises a DU associated with a maintenance base station for the target cell.

In one embodiment, the second node U1 is a maintenance base station for a cell identified by the first PCI.

In one embodiment, a cell identified by the first PCI is a serving cell of the first node, and the second node U1 is a maintenance base station for the cell identified by the first PCI.

In one embodiment, the second node is not a maintenance base station for a cell identified by the first PCI.

In one embodiment, a cell identified by the first PCI is not a serving cell of the first node, and the second node is not a maintenance base station for the cell identified by the first PCI.

In one embodiment, the second node is a TRP in a cell identified by the first PCI.

In one embodiment, a cell identified by the first PCI is a serving cell of the first node, and the second node is a TRP in the cell identified by the first PCI.

In one embodiment, the second node is not a TRP in a cell identified by the first PCI.

In one embodiment, a cell identified by the first PCI is not a serving cell of the first node, and the second node is not a TRP in the cell identified by the first PCI.

In one embodiment, the third node U3 comprises a maintenance base station for a serving cell of the first node U2.

In one embodiment, the third node U3 does not comprise a maintenance base station for a serving cell of the first node U2.

In one embodiment, the third node U3 comprises a maintenance base station for a cell identified by the second PCI.

In one embodiment, the third node U3 comprises a TRP in a cell identified by the second PCI.

In one embodiment, the third node U3 comprises a DU in a cell identified by the second PCI.

In one embodiment, the third node U3 comprises a DU associated with a maintenance base station for a cell identified by the second PCI.

In one embodiment, the second node U1 and the third node U3 comprise two different base stations, respectively.

In one embodiment, the second node U1 and the third node U3 comprise two different TRPs, respectively.

In one embodiment, the second node U1 and the third node U3 comprise a same base station.

In one embodiment, the second node U1 and the third node U3 comprise a same TRP.

In one embodiment, the second node U1 and the third node U3 are two different TRPs of a same DU.

In one embodiment, the second node U1 and the third node U3 are two different TRPs of a same base station.

In one embodiment, the second node U1 and the third node U3 are quasi co-located.

In one embodiment, the second node U1 and the third node U3 are not quasi co-located.

In one embodiment, one occurrence of the first signal in time domain is earlier than the first reference signal.

In one embodiment, one occurrence of the first signal in time domain is later than the first reference signal.

In one embodiment, one occurrence of the first signal in time domain is earlier than one occurrence of the first reference signal resource in time domain.

In one embodiment, one occurrence of the first signal in time domain is later than one occurrence of the first reference signal resource in time domain.

In one embodiment, one occurrence of the first signal in time domain is earlier than the first configuration information block.

In one embodiment, one occurrence of the first signal in time domain is later than the first configuration information block.

In one embodiment, one occurrence of the first reference signal resource in time domain is earlier than the first configuration information block.

In one embodiment, one occurrence of the first reference signal resource in time domain is later than the first configuration information block.

In one embodiment, the first configuration information block is transmitted on a Physical Downlink Shared Channel (PDSCH).

In one embodiment, the first configuration information block is comprised of two parts, and the two parts are respectively transmitted on different PDSCHs.

In one embodiment, the steps in the box F51 in FIG. 5 are present; whether a first condition is satisfied is used to determine whether the first reference signal and the first signal are quasi co-located; the first condition includes that there is a PCI in a first PCI set that is equal to the second PCI; a first TCI state set is used to determine the first PCI set, the first TCI state belonging to the first TCI state set; the first information block indicates the first TCI state set.

In one embodiment, the first configuration information block is earlier than the first information block in time domain.

In one embodiment, the first configuration information block is later than the first information block in time domain.

In one embodiment, the first information block is transmitted on a PDSCH.

In one embodiment, the first information block is transmitted on a Physical Downlink Control Channel (PDCCH).

In one embodiment, the steps in the box F52 in FIG. 5 are present; the second configuration information block indicates configuration information for the first signal.

In one embodiment, the first configuration information block is earlier than the second configuration information block in time domain.

In one embodiment, the first configuration information block is later than the second configuration information block in time domain.

In one embodiment, the second configuration information block is transmitted on a PDSCH.

In one embodiment, the step in the box F53 in FIG. 5 is present and the step in the box F54 is absent; the method in a second node used for wireless communications comprises: transmitting the second reference signal.

In one embodiment, the step in box F54 in FIG. 5 is present and the step in the box F53 is absent; the third node U3 transmits the second reference signal.

In one embodiment, the step in the box F55 in FIG. 5 is present; the method in the first node used for wireless communications comprises: receiving the second reference signal.

In one embodiment, the steps in the boxes F53 and F55 in FIG. 5 are present and the step in the box F54 is absent.

In one embodiment, the steps in the boxes F54 and F55 in FIG. 5 are present and the step in the box F53 is absent.

In one embodiment, the step in the box F55 in FIG. 5 is present and the steps in the boxes F53 and F54 are absent.

In one embodiment, the step in the box F56 in FIG. 5 is present and the step in the box F57 is absent; the method in a second node used for wireless communications comprises: transmitting the first reference signal.

In one embodiment, the step in the box F57 in FIG. 5 is present and the step in the box F56 is absent; the third node U3 transmits the first reference signal.

In one embodiment, the steps in the boxes F53 and F56 in FIG. 5 are present or absent at the same time, and the steps in the boxes F54 and F57 are present or absent at the same time.

Embodiment 6

Figures 6, 7, 8, 9, 10, 11:
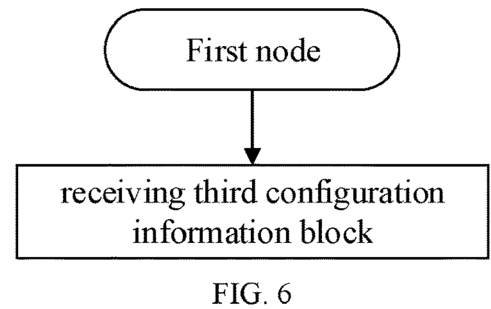
FIG. 6 illustrates a schematic diagram of a third configuration information block according to one embodiment of the present application.
FIG. 7 illustrates a schematic diagram of a first configuration information block according to one embodiment of the present application.
FIG. 8 illustrates a schematic diagram of a first configuration information block according to one embodiment of the present application.
FIG. 9 illustrates a schematic diagram of a first configuration information block according to one embodiment of the present application.
FIG. 10 illustrates a schematic diagram of a first configuration information block indicating a first PCI according to one embodiment of the present application.
FIG. 11 illustrates a schematic diagram of a first TCI state indicating a first PCI according to one embodiment of the present application.

Embodiment 6 illustrates a schematic diagram of a third configuration information block according to one embodiment of the present application, as shown in FIG. 6. In Embodiment 6, the first node receives a third configuration information block, the third configuration information block indicating the first TCI state.

In one embodiment, a third configuration information block indicates that a TCI state of the first reference signal is the first TCI state.

In one embodiment, a third configuration information block indicates that a TCI state of the first reference signal resource is the first TCI state.

In one embodiment, the third configuration information block is carried by an RRC signaling.

In one embodiment, the third configuration information block is carried by a MAC CE.

In one embodiment, the third configuration information block comprises information in at least one IE.

In one subembodiment, a name of the IE includes "CSI-AperiodicTriggerState".

In one embodiment, the third configuration information block comprises information in at least one MAC CE.

In one subembodiment, a name of the MAC CE includes "SP CSI-RS/CSI-IM Resource Set Activation/Deactivation".

In one embodiment, the first configuration information block and the third configuration information block are respectively carried by different IEs.

In one embodiment, the meaning of the sentence that the configuration information for the first reference signal is used to determine a first PCI includes: the third configuration information block indicating the first PCI.

In one embodiment, the third configuration information block explicitly indicates the first PCI.

In one embodiment, the third configuration information block implicitly indicates the first PCI.

In one embodiment, the third configuration information block indicates a first cell index, the first cell index being used to determine the first PCI.

In one embodiment, the third configuration information block and the first configuration information block are transmitted in a same cell.

Embodiment 7

Embodiment 7 illustrates a schematic diagram of a first configuration information block according to one embodiment of the present application, as shown in FIG. 7. In Embodiment 7, the first configuration information block comprises information in a first field in a first IE, the first field in the first IE indicating the first TCI state.

In one embodiment, a name of the first IE includes "NZP-CSI-RS-Resource".

In one embodiment, a name of the first field includes "qcl-InfoPeriodicCSI-RS".

In one embodiment, the first reference signal is periodic.

Embodiment 8

Embodiment 8 illustrates a schematic diagram of a first configuration information block according to one embodiment of the present application, as shown in FIG. 8. In Embodiment 8, the first configuration information block comprises information in a first IE and information in a second IE, the second IE indicating the first TCI state.

In one embodiment, the first IE indicates part or all of a time-domain resource, a frequency-domain resource, a CDM type, a CDM group, an RS sequence, scrambling, periodicity, a slot offset, density, or a number of reference signal ports for the first reference signal.

In one embodiment, the first IE indicates a fourth IE, the fourth IE indicating part or all of a time-domain resource, a frequency-domain resource, a CDM type, a CDM group, an RS sequence, scrambling, periodicity, a slot offset, density, or a number of reference signal ports for the first reference signal.

In one subembodiment, the first IE directly indicates the fourth IE.

In one subembodiment, the first IE indirectly indicates the fourth IE.

In one subembodiment, the first IE indirectly indicates the fourth IE by indicating another IE.

In one embodiment, the first IE and the second IE are associated via a same CSI report configuration identifier.

In one embodiment, a name of the first IE includes "CSI-ReportConfig".

In one embodiment, a name of the first IE includes "NZP-CSI-RS-Resource".

In one embodiment, a name of the second IE includes "CSI-AperiodicTriggerStateList".

In one embodiment, a name of the fourth IE includes "NZP-CSI-RS-Resource".

In one embodiment, the first IE indicates a first CSI report configuration identifier, and the first IE indicates that a reference signal resource associated with the first CSI report configuration identifier comprises a first reference signal resource, the first reference signal being transmitted in the first reference signal resource; the second IE indicates at least one CSI report configuration identifier, the at least one CSI report configuration identifier including the first CSI report configuration identifier, and the second IE indicates at least one TCI state, each TCI state of the at least one TCI state corresponding to a reference signal resource associated with one CSI report configuration identifier of the at least one CSI report configuration identifier; the first TCI state is a TCI state of the at least one TCI state that corresponds to the first reference signal resource.

In one embodiment, the first reference signal is aperiodic.

In one embodiment, a reference signal resource associated with a CSI report configuration identifier comprises a reference signal resource indicated by a configuration IE of a CSI report identified by the CSI report configuration identifier.

In one embodiment, a reference signal resource associated with a CSI report configuration identifier comprises a reference signal resource for channel measurement indicated by a configuration IE of a CSI report identified by the CSI report configuration identifier.

In one embodiment, a reference signal resource associated with a CSI report configuration identifier is used to obtain a channel measurement for calculating a CSI report identified by the CSI report configuration identifier.

In one embodiment, the reference signal resource comprises a CSI-RS resource.

In one embodiment, the reference signal resource comprises an SS/PBCH Block resource.

Embodiment 9

Embodiment 9 illustrates a schematic diagram of a first configuration information block according to one embodiment of the present application, as shown in FIG. 9. In Embodiment 9, the first configuration information block comprises information in a first IE and information in a first MAC CE, the first MAC CE indicating the first TCI state.

In one embodiment, the first IE and the first MAC CE are associated via a same CSI-RS resource set identifier.

In one embodiment, the first IE indicates a first reference signal resource set identifier, and a reference signal resource set identified by the first reference signal resource set identifier comprises a first reference signal resource, the first reference signal being transmitted in the first reference signal resource; a reference signal resource set identifier indicated by the first MAC CE is equal to the first reference signal resource set identifier; the first MAC CE indicates at least one TCI state, each TCI state of the at least one TCI state corresponding to a reference signal resource in the reference signal resource set identified by the first reference signal resource set identifier; the first TCI state is a TCI state of the at least one TCI state that corresponds to the first reference signal resource.

In one subembodiment, the reference signal resource set comprises a CSI-RS resource set, and the reference signal resource includes a CSI-RS resource.

In one embodiment, a name of the first IE includes "NZP-CSI-RS-ResourceSet".

In one embodiment, a name of the first MAC CE includes "SP CSI-RS/CSI-IM Resource Set Activation/Deactivation".

In one embodiment, the first reference signal is semi-persistent.

Embodiment 10

Embodiment 10 illustrates a schematic diagram of a first configuration information block indicating a first PCI according to one embodiment of the present application, as shown in FIG. 10.

In one embodiment, the meaning of the sentence that the configuration information for the first reference signal is used to determine a first PCI includes: the first configuration information block being used to determine the first PCI.

In one embodiment, the meaning of the sentence that the configuration information for the first reference signal is used to determine a first PCI includes: the first configuration information block indicating the first PCI.

In one embodiment, the first configuration information block explicitly indicates the first PCI.

In one embodiment, the first configuration information block implicitly indicates the first PCI.

In one embodiment, if the first configuration information block does not comprise a field explicitly indicating a cell index, the first PCI is a PCI of the target cell.

In one embodiment, the cell index includes a SCellIndex.

In one embodiment, the cell index includes a ServCellIndex.

In one embodiment, the first configuration information block indicates a first cell index, the first cell index being used to determine the first PCI.

In one embodiment, the first cell index is a SCellIndex of a cell identified by the first PCI.

In one embodiment, the first cell index is a ServCellIndex of a cell identified by the first PCI.

In one embodiment, the first PCI is a PCI of a cell identified by the first cell index.

Embodiment 11

Embodiment 11 illustrates a schematic diagram of a first TCI state indicating a first PCI according to one embodiment of the present application, as shown in FIG. 11.

In one embodiment, the meaning of the sentence that the configuration information for the first reference signal is used to determine a first PCI includes: the first TCI state being used to determine the first PCI.

In one embodiment, the meaning of the sentence that the configuration information for the first reference signal is used to determine a first PCI includes: the first TCI state indicating the first PCI.

In one embodiment, the first TCI state explicitly indicates the first PCI.

In one embodiment, the explicit indicating includes indicating directly.

In one embodiment, the first TCI state implicitly indicates the first PCI.

In one embodiment, the implicit indicating includes indicating by indicating another TCI state.

In one embodiment, the implicit indicating includes indicating indirectly.

In one embodiment, if the first TCI state does not include a field explicitly indicating a cell index, the first PCI is equal to a PCI of the target cell.

In one embodiment, the first TCI state indicates a first cell index, the first cell index being used to determine the first PCI.

In one embodiment, the first TCI state indicates a first cell index, the first PCI being independent of the first cell index.

In one embodiment, the first TCI state indicates the first cell index with respect to the second reference signal.

In one embodiment, the first TCI state indicates the first cell index with respect to the second reference signal; when the second reference signal is an SS/PBCH, the first cell index is used to determine the first PCI; when the second reference signal is not an SS/PBCH, the TCI state of the second reference signal is used to determine the first PCI.

In one embodiment, the first TCI state indicates that a QCL type corresponding to the second reference signal includes QCL-TypeD and indicates the first cell index with respect to the second reference signal; when the second reference signal is an SS/PBCH, the first cell index is used to determine the first PCI; when the second reference signal is not an SS/PBCH, the TCI state of the second reference signal is used to determine the first PCI.

In one embodiment, the first TCI state indicates that a QCL type corresponding to the second reference signal includes QCL-TypeD and indicates no cell index with respect to the second reference signal; when the second reference signal is an SS/PBCH, the first PCI is the PCI of the target cell; when the second reference signal is not an SS/PBCH, the TCI state of the second reference signal is used to determine the first PCI.

In one embodiment, the second reference signal and the first cell index are indicated in a same QCL-Info.

In one embodiment, the first cell index is a non-negative integer.

In one embodiment, the first cell index includes a SCellIndex.

In one embodiment, the first cell index includes a ServCellIndex.

In one embodiment, the first cell index is equal to the first PCI.

In one embodiment, the first cell index is unequal to the first PCI.

In one embodiment, the first cell index is used to determine the first PCI, which can be obtained from the first cell index without doubt.

In one embodiment, the first cell index and the first PCI identify different cells, respectively.

In one embodiment, the first cell index is a SCellIndex of a cell identified by the first PCI.

In one embodiment, the first cell index is a ServCellIndex of a cell identified by the first PCI.

In one embodiment, the first PCI is a PCI of a cell identified by the first cell index.

In one embodiment, the first cell index is generated by the first PCI.

In one embodiment, an air interface resource occupied by the second reference signal is indicated by a configuration information block, and a Radio Link Control (RLC) Bearer through which the configuration information block is conveyed is configured by a CellGroupConfig IE.

In one subembodiment, a SpCell configured by the CellGroupConfig IE includes the cell identified by the first PCI.

In one subembodiment, a SpCell configured by the CellGroupConfig IE does not include the cell identified by the first PCI.

In one subembodiment, a SpCell configured by the CellGroupConfig IE includes the target cell.

In one subembodiment, the configuration information block is borne by an RRC signaling.

In one subembodiment, the air interface resource comprises at least one of a time-frequency resource, an RS sequence or a code-domain resource.

In one embodiment, the second reference signal is transmitted in a cell identified by the first PCI.

In one embodiment, the first PCI is used to generate the second reference signal.

In one embodiment, the first TCI state indicates that the second reference signal is quasi co-located with an SS/PBCH Block of a cell identified by the first PCI.

In one embodiment, the first TCI state indicates that the second reference signal is quasi co-located with a third reference signal, the third reference signal being quasi co-located with an SS/PBCH Block of a cell identified by the first PCI.

In one embodiment, the first TCI state indicates the second reference signal and a fourth reference signal, and the first TCI state indicates that the second reference signal and the fourth reference signal correspond to different QCL types.

In one subembodiment, the second reference signal corresponds to QCL-TypeD, while the fourth reference signal corresponds to a QCL type different from QCL-TypeD.

In one subembodiment, the fourth reference signal corresponds to QCL-TypeD, while the second reference signal corresponds to a QCL type different from QCL-TypeD.

In one subembodiment, the first TCI state does not indicate a cell index to the second reference signal, the first PCI being equal to the PCI of the target cell.

In one subembodiment, the first TCI state does not indicate a cell index to the second reference signal; the first PCI is equal to the PCI of the target cell when the second reference signal is an SS/PBCH; and when the second reference signal is not an SS/PBCH, the TCI state of the second reference signal is used to determine the first PCI.

In one subembodiment, the first TCI state indicates a first cell index and a second cell index, the first cell index and the second cell index corresponding to the second reference signal and the fourth reference signal, respectively.

In one reference embodiment of the above subembodiments, the second reference signal and the first cell index are indicated in a same QCL-Info, and the fourth reference signal and the second cell index are indicated in a same QCL-Info.

In one reference embodiment of the above subembodiments, the first cell index is equal to the second cell index.

In one reference embodiment of the above subembodiments, the first cell index is not equal to the second cell index, and only the first cell index of the first cell index and the second cell index is used to determine the first PCI.

In one reference embodiment of the above subembodiments, the first cell index is used to determine the first PCI when the second reference signal is an SS/PBCH; a TCI state of the second reference signal is used to determine the first PCI when the second reference signal is not an SS/PBCH.

In one reference embodiment of the above subembodiments, the first TCI state indicates that the second reference signal is quasi co-located with a SS/PBCH Block in a cell identified by the first cell index, or, alternatively, the first TCI state indicates that the second reference signal is quasi co-located with a third reference signal, and that the third reference signal is quasi co-located with an SS/PBCH Block in the cell identified by the first cell index.

In one reference embodiment of the above subembodiments, the first TCI state indicates that the fourth reference signal is quasi co-located with a SS/PBCH Block in a cell identified by the second cell index, or, alternatively, the first TCI state indicates that the fourth reference signal is quasi co-located with a fifth reference signal, and that the fifth reference signal is quasi co-located with an SS/PBCH Block in the cell identified by the second cell index.

In one embodiment, the fourth reference signal comprises a CSI-RS.

In one embodiment, the fourth reference signal comprises a SS/PBCH Block.

In one embodiment, when the first reference signal and the first signal are non-quasi co-located, the first reference signal is quasi co-located with both the second reference signal and the fourth reference signal.

In one subembodiment, the first node assumes that the first reference signal is quasi co-located with both the second reference signal and the fourth reference signal.

In one subembodiment, the first reference signal and the second reference signal correspond to QCL-TypeD, while the first reference signal and the fourth reference signal correspond to one of QCL-TypeA, QCL-TypeB or QCL-TypeC.

Embodiment 12

Embodiment 12 illustrates a schematic diagram of a target cell and a cell identified by a second PCI according to one embodiment of the present application, as shown in FIG. 12.

In one embodiment, the sentence the target cell being a serving cell of the first node means that: the first node performs SCell addition for the target cell.

In one embodiment, the sentence the target cell being a serving cell of the first node means that: the target cell is configured via a sCellToAddModList IE.

In one embodiment, the sentence the target cell being a serving cell of the first node means that: the first node is assigned a SCellIndex for the target cell.

In one embodiment, the sentence the target cell being a serving cell of the first node means that: the first node is assigned a ServCellIndex for the target cell.

In one embodiment, the sentence the target cell being a serving cell of the first node means that: an RRC connection has been established between the first node and the target cell.

In one embodiment, the sentence the target cell being a serving cell of the first node means that: a Cell-Radio Network Temporary Identifier (C-RNTI) of the first node is assigned by the target cell.

In one embodiment, the target cell is a Special Cell (SpCell) of the first node.

In one embodiment, the target cell is a Primary Cell (PCell) of the first node.

In one embodiment, the target cell is a Secondary Cell (SCell) of the first node.

In one embodiment, the first configuration information block is transmitted in the target cell.

In one embodiment, the first configuration information block is transmitted in a cell group to which the target cell belongs.

In one embodiment, the first configuration information block is transmitted in a cell identified by the second PCI.

In one embodiment, the first configuration information block is transmitted in a cell identified by the first PCI.

In one embodiment, the first configuration information block is transmitted by a cell group configured by a third IE, whose name includes "CellGroupConfig".

In one embodiment, an RLC bearer over which the first configuration information block is conveyed is configured via a third IE, and a SpCell configured by the third IE includes the target cell; the name of the third IE includes "CellGroupConfig".

In one embodiment, the third IE is a CellGroupConfig IE.

In one embodiment, a transmitter of the first configuration information block is a TRP in the target cell.

In one embodiment, a first RNTI is used to generate a scrambling sequence for a PDSCH carrying the first configuration information block, the first RNTI being configured by the target cell.

In one embodiment, the PCI of the target cell is a non-negative integer.

In one embodiment, the PCI of the target cell is a non-negative integer no greater than 1007.

In one embodiment, the PCI of the target cell is used to generate a scrambling sequence for a PDSCH carrying the first configuration information block.

In one embodiment, a first RNTI is used to generate an RS sequence for DMRS of a PDSCH carrying the first configuration information block, the first RNTI being configured by the target cell.

In one embodiment, the PCI of the target cell is used to generate an RS sequence for DMRS of a PDSCH carrying the first configuration information block.

In one embodiment, the first signal is transmitted in a cell identified by the second PCI.

In one embodiment, a cell identified by the second PCI is not a serving cell of the first node.

In one embodiment, a cell identified by the second PCI is not a SpCell of the first node, nor is it configured via a sCellToAddModList IE.

In one embodiment, a cell identified by the second PCI is not a SpCell of the first node, nor is it a SCell of the first node.

In one embodiment, the meaning of the sentence that a cell identified by the second PCI is not a serving cell of the first node comprises that the first node has not performed SCell addition for the cell identified by the second PCI.

In one embodiment, the meaning of the sentence that a cell identified by the second PCI is not a serving cell of the first node comprises: a latest sCellToAddModList received by the first node does not include the cell identified by the second PCI.

In one embodiment, the meaning of the sentence that a cell identified by the second PCI is not a serving cell of the first node comprises: neither a latest sCellToAddModList received by the first node nor a sCellToAddModListSCG includes the cell identified by the second PCI.

In one embodiment, the meaning of the sentence that a cell identified by the second PCI is not a serving cell of the first node comprises that the first node is not assigned a SCellIndex for the cell identified by the second PCI.

In one embodiment, the meaning of the sentence that a cell identified by the second PCI is not a serving cell of the first node comprises that the first node is not assigned a ServCellIndex for the cell identified by the second PCI.

In one embodiment, the meaning of the sentence that a cell identified by the second PCI is not a serving cell of the first node comprises that no RRC connection is established between the first node and the cell identified by the second PCI.

In one embodiment, the meaning of the sentence that a cell identified by the second PCI is not a serving cell of the first node comprises: a C-RNTI of the first node is not assigned by the cell identified by the second PCI.

In one embodiment, the SCellIndex is a positive integer no greater than 31.

In one embodiment, the ServCellIndex is a positive integer no greater than 31.

In one embodiment, when a cell is configured via a sCellToAddModList IE, the cell is a serving cell; when a cell is a SpCell, the cell is a serving cell.

In one embodiment, when a cell is neither configured via a sCellToAddModList IE nor a SpCell, the cell is not a serving cell.

In one embodiment, when a cell is neither configured via a sCellToAddModList IE nor a Spcell, the cell is an additional or auxiliary cell.

In one embodiment, a cell identified by the first PCI is a serving cell of the first node.

In one embodiment, a cell identified by the first PCI is not a serving cell of the first node.

In one embodiment, the cell identified by a PCI is: a cell with a PCI equal to the PCI.

In one embodiment, an RRC layer of the first node terminates at the target cell.

In one embodiment, a Packet Data Convergence Protocol (PDCP) layer of the first node terminates at the target cell.

In one embodiment, a Radio Link Control (RLC) layer of the first node terminates at the target cell.

In one embodiment, a MAC sublayer of the first node terminates at the target cell.

In one embodiment, the target cell is a physical cell.

In one embodiment, a cell identified by the second PCI is a physical cell.

In one embodiment, a cell identified by the second PCI provides additional resources on top of the target cell.

In one embodiment, a cell identified by the second PCI is an additional cell.

In one embodiment, the additional cell is not a serving cell.

In one embodiment, the additional cell is a cell used for inter-cell mobility.

In one embodiment, the additional cell is a cell used for inter-cell beam management.

In one embodiment, the additional cell is a cell used for inter-cell mobility of L1/L2.

In one embodiment, the additional cell is a cell used for inter-cell beam management of L1/L2.

In one embodiment, a cell identified by the second PCI and the target cell are intra-frequency cells.

In one embodiment, a cell identified by the second PCI and the target cell are inter-frequency cells.

In one embodiment, a cell identified by the second PCI is capable of being used to transmit data.

In one embodiment, a cell identified by the second PCI is capable of being alternatively used as a candidate cell for transmitting and receiving data.

In one embodiment, when the first node transmits data using the cell identified by the second PCI, a serving cell of the first node remains unchanged.

In one subembodiment, the phrase that a serving cell remains unchanged means that the protocol stack of at least one of the RRC layer, the PDCP layer, the RLC layer, the MAC sublayer or the PHY layer does not require relocation.

In one subembodiment, the phrase that a serving cell remains unchanged means that the RRC connection remains unchanged.

In one subembodiment, the phrase that a serving cell remains unchanged means that the serving cell identity remains unchanged.

In one subembodiment, the phrase that a serving cell remains unchanged means that: all or part of ServingCell-ConfigCommon and/or ServingCellConfigCommonSIB configurations remains unchanged.

In one embodiment, different RNTIs are used to determine a scrambling sequence of a physical layer channel transmitted or received by the first node in a cell identified by the second PCI and a scrambling sequence of a physical layer channel transmitted or received in the target cell.

In one subembodiment, the physical layer channel includes one or more of a PDCCH, a PDSCH, a Physical Uplink Control Channel (PUCCH) or a Physical Uplink Shared CHannel (PUSCH).

In one embodiment, the Cyclic Redundancy Check (CRC) of a DCI received by the first node in the cell identified by the second PCI and the CRC of a DCI received by the first node in the target cell are scrambled by different RNTIs.

Embodiment 13

Embodiment 13 illustrates a schematic diagram of whether a first reference signal and a first signal are quasi co-located according to one embodiment of the present application, as shown in FIG. 13. In Embodiment 13, when the first PCI is equal to the second PCI, the first reference signal and the first signal are quasi co-located; when the first PCI is not equal to the second PCI, the first node itself determines whether the first reference signal and the first signal are quasi co-located.

In one embodiment, when the first PCI is not equal to the second PCI, the first node itself determines whether the first reference signal and the first signal are quasi co-located (QCL).

In one embodiment, when the first PCI is not equal to the second PCI, the first node itself determines that the first reference signal and the first signal are non-quasi co-located (non-QCL).

Embodiment 14

Embodiment 14 illustrates a schematic diagram of whether a first reference signal and a first signal are quasi co-located according to one embodiment of the present application, as shown in FIG. 14. In Embodiment 14, when the first PCI is equal to the second PCI, the first reference signal and the first signal are quasi co-located (QCL); when the first PCI is not equal to the second PCI, the first reference signal and the first signal are non-quasi co-located (non-QCL).

In one embodiment, when the first PCI is not equal to the second PCI, the first node doesn't assume that the first reference signal and the first signal are quasi co-located.

Embodiment 15

Embodiment 15 illustrates a schematic diagram of whether a first reference signal and a first signal are quasi co-located according to one embodiment of the present application, as shown in FIG. 15. In Embodiment 15, when the first condition is satisfied, the first reference signal and the first signal are quasi co-located (QCL); when the first condition is not satisfied, the first reference signal and the first signal are non-quasi co-located (non-QCL).

In one embodiment, when the first condition is satisfied, the first node assumes that the first reference signal and the first signal are quasi co-located; when the first condition is not satisfied, the first node does not assume that the first reference signal and the first signal are quasi co-located.

In one embodiment, the first condition is satisfied when the first PCI is equal to the second PCI.

In one embodiment, the first condition only comprises that there is a PCI in the first PCI set that is equal to the second PCI.

In one embodiment, the first condition is satisfied when there exists one PCI in the first PCI set that is equal to the second PCI; the first condition is not satisfied when each PCI in the first PCI set is not equal to the second PCI.

In one embodiment, the first TCI state set comprises at least one TCI state, and the first PCI set comprises at least one PCI.

In one embodiment, a number of TCI states included in the first TCI state set is equal to a number of PCIs included in the first PCI set, all TCI states in the first TCI state set and all PCIs in the first PCI set are in one-to-one correspondence; any one of the TCI states in the first TCI state set is used to determine a corresponding PCI.

In one embodiment, the first TCI state set comprises only one TCI state, and the first PCI set comprises only one PCI, the TCI state corresponding to the PCI, and the TCI state being used to determine the PCI.

In one embodiment, the first TCI state set comprises S TCI states, and the first PCI set comprises S PCIs, S being a positive integer greater than 1; the S TCI states and the S PCIs being in one-to-one correspondence, the S TCI states being used to determine the S PCIs respectively.

In one embodiment, any TCI state in the first TCI state set indicates a corresponding PCI in the first PCI set.

In one embodiment, there exists a TCI state in the first TCI state set that explicitly indicates a corresponding PCI in the first PCI set.

In one embodiment, there exists a TCI state in the first TCI state set that implicitly indicates a corresponding PCI in the first PCI set.

In one embodiment, for any TCI state in the first TCI state set, if the any TCI state does not include a field explicitly indicating a cell index, a PCI corresponding to the any TCI state is the PCI of the target cell.

In one embodiment, for any TCI state in the first TCI state set, if the any TCI state indicates only one reference signal resource and indicates a cell index with respect to the only one reference signal resource, the cell index is used to determine a PCI corresponding to the any TCI state.

In one embodiment, for any TCI state in the first TCI state set, if the any TCI state indicates two reference signal resources and indicates a cell index with respect to each of the two reference signal resources respectively, a cell index corresponding to the reference signal resource corresponding to QCL-TypeD of the two reference signal resources is used to determine a PCI corresponding to the any TCI state.

In one embodiment, for any TCI state in the first TCI state set, if the any TCI state indicates two reference signal resources and the reference signal resource corresponding to QCL-TypeD of the two reference signal resources does not indicate a cell index, a PCI corresponding to the any TCI state is equal to the PCI of the target cell.

In one embodiment, for any TCI state in the first TCI state set, if the any TCI state does not include a field explicitly indicating a cell index and a reference signal resource indicated by the any TCI state comprises an SS/PBCH Block resource, a PCI corresponding to the any TCI state is the PCI of the target cell.

In one embodiment, for any TCI state in the first TCI state set, if the any TCI state indicates only one SS/PBCH Block resource and indicates a cell index with respect to the only one SS/PBCH Block resource, the cell index is used to determine a PCI corresponding to the any TCI state.

In one embodiment, for any TCI state in the first TCI state set, if the any TCI state indicates one CSI-RS resource and one SS/PBCH Block resource and indicates a cell index with respect to each of the one CSI-RS resource and the one SS/PBCH Block resource respectively, only the cell index corresponding to the one SS/PBCH Block resource of the one CSI-RS resource and the one SS/PBCH Block resource is used to determine a PCI corresponding to the any TCI state.

In one subembodiment, the one SS/PBCH Block resource corresponds to QCL-TypeD.

In one embodiment, for any TCI state in the first TCI state set, if the any TCI state indicates one CSI-RS resource and one SS/PBCH Block resource and indicates no cell index with respect to the one SS/PBCH Block resource, a PCI corresponding to the any TCI state is equal to the PCI of the target cell.

In one subembodiment, the one SS/PBCH Block resource corresponds to QCL-TypeD.

In one embodiment, for any TCI state in the first TCI state set, if one or more reference signal resources indicated by the any TCI state does/do not include an SS/PBCH Block resource, TCI state(s) of the one or more reference signal resources indicated by the any TCI state is used to determine the PCI corresponding to the any TCI state.

In one subembodiment, the TCI state of a reference signal resource of the more reference signal resources of which the corresponding QCL type is QCL-TypeD is used to determine the PCI corresponding to the any TCI state.

In one embodiment, the number of TCI states included in the first TCI state set is not greater than 8.

In one embodiment, the number of TCI states included in the first TCI state set is not greater than 128.

In one embodiment, there are two equal PCIs in the first PCI set.

In one embodiment, there are two unequal PCIs in the first PCI set.

In one embodiment, any PCI in the first PCI set is a non-negative integer.

In one embodiment, the first TCI state set is configured by a higher layer signaling.

In one embodiment, the first TCI state set is configured by an RRC signaling.

In one embodiment, the first TCI state set is configured by a MAC CE.

In one embodiment, the first TCI state set is configured by a layer 1 (L1) signaling.

In one embodiment, the first TCI state set is configured by an RRC signaling and a MAC CE together.

In one embodiment, the first TCI state set is configured by a MAC CE and a L1 signaling together.

In one embodiment, the first TCI state set is configured by an RRC signaling, a MAC CE and a L1 signaling together.

In one embodiment, the first TCI state set is configured by the target cell.

In one embodiment, the first TCI state set is configured by a cell group to which the target cell belongs.

In one embodiment, the first TCI state is a TCI state in the first TCI state set.

In one embodiment, the first PCI set comprises the first PCI.

In one embodiment, the first PCI set comprises the first PCI, the first PCI being a PCI corresponding to the first TCI state in the first PCI set.

In one embodiment, the first TCI state set is configured by the second node.

In one embodiment, the first TCI state set is configured by a node different from the second node.

In one embodiment, the first TCI state set is used by the first node to determine the first PCI set.

Embodiment 16

Embodiment 16 illustrates a schematic diagram of a first information block indicating a first TCI state set according to one embodiment of the present application, as shown in FIG. 16.

In one embodiment, the first information block indicates each TCI state in the first TCI state set.

In one embodiment, the first information block indicates a TCI state identifier corresponding to each TCI state in the first TCI state set.

In one embodiment, the first information block indicates a reference signal indicated by each TCI state in the first TCI state set.

In one embodiment, the first information block comprises configuration information for each TCI state in the first TCI state set.

In one embodiment, configuration information for a TCI state includes some or all of a TCI state identifier, one or two reference signal resources, a QCL type corresponding to each reference signal resource of the one or two reference signal resources, a cell index corresponding to each reference signal resource of the one or two reference signal resources, or a BWP index corresponding to each reference signal resource of the one or two reference signal resources.

In one embodiment, the first information block is borne by an RRC signaling.

In one embodiment, the first information block is borne by a MAC CE.

In one embodiment, the first information block is borne by a layer 1 (L1) signaling.

In one embodiment, the first information block is borne by an RRC signaling and a MAC CE together.

In one embodiment, the first information block is borne by an RRC signaling, a MAC CE and a layer 1 (L1) signaling together.

In one embodiment, the first information block is borne by a MAC CE and a layer 1 (L1) signaling together.

In one embodiment, the first information block comprises information in at least one IE, any of the at least one IE including "TCI-State" in its name.

In one embodiment, the first information block comprises information in a MAC CE that is used for TCI state activation.

In one embodiment, the first information block activates each TCI state in the first TCI state set.

In one embodiment, the first information block indicates the first TCI state set from a first TCI state pool, the first TCI state pool comprising multiple TCI states, the first TCI state set being a subset of the first TCI state pool.

In one subembodiment, the first TCI state pool comprises K TCI states, and the first information block comprises K bits, the K bits corresponding to the K TCI states respectively, K being a positive integer greater than 1; the first TCI state set comprises all TCI states in the first TCI state pool whose corresponding bits are equal to 1.

In one embodiment, the first information block comprises Downlink Control Information (DCI).

In one embodiment, the first information block comprises DCI for DL Grant.

In one embodiment, the first information block comprises a DCI, the first information block corresponding to a DCI format being one of DCI format 1_0, DCI format 1_1 or DCI format 1_2.

In one embodiment, the first information block is transmitted in the target cell.

In one embodiment, the first information block is transmitted in a cell group to which the target cell belongs.

In one embodiment, the first information block is transmitted in a cell to which the second PCI belongs.

In one embodiment, the first information block is transmitted in a cell to which the first PCI belongs.

Embodiment 17

Embodiment 17 illustrates a schematic diagram of a second configuration information block indicating configuration information for a first signal according to one embodiment of the present application, as shown in FIG. 17.

In one embodiment, the second configuration information block is carried by a higher layer signaling.

In one embodiment, the second configuration information block is carried by an RRC signaling.

In one embodiment, the second configuration information block is carried by a MAC CE.

In one embodiment, the configuration information for the first signal comprises one or more of an occupied time-domain resource, a periodicity, a transmit power, a synchronization signal sequence, or a subcarrier spacing.

In one embodiment, the second configuration information block is transmitted in the target cell.

In one embodiment, the second configuration information block is transmitted in a cell group to which the target cell belongs.

In one embodiment, the second configuration information block is transmitted in a cell identified by the first PCI.

In one embodiment, the second configuration information block is transmitted in a cell identified by the second PCI.

Embodiment 18

Embodiment 18 illustrates a schematic diagram of a relationship between the subcarrier spacing of a first reference signal and the subcarrier spacing of a first signal according to one embodiment of the present application; as shown in FIG. 18. In Embodiment 18, whether the first reference signal and the first signal are quasi co-located is used by the first node to determine a subcarrier spacing of the first reference signal. When the first reference signal and the first signal are quasi co-located (QCL), the subcarrier spacing of the first reference signal is equal to the subcarrier spacing of the first signal; when the first reference signal and the first signal are non-quasi co-located (non-QCL), the subcarrier spacing of the first reference signal is unrelated to the subcarrier spacing of the first signal.

In one embodiment, when the first reference signal and the first signal are non-quasi co-located, the configuration information for the first reference signal is used to determine the subcarrier spacing of the first reference signal.

In one embodiment, when the first reference signal and the first signal are non-quasi co-located, the subcarrier spacing of the first reference signal is equal to a subcarrier spacing of a BWP to which the first reference signal belongs.

In one embodiment, when the first reference signal and the first signal are non-quasi co-located, the first node determines by itself whether the subcarrier spacing of the first reference signal is equal to the subcarrier spacing of the first signal.

Embodiment 19

Embodiment 19 illustrates a structure block diagram of a processing device used in a first node according to one embodiment of the present application, as shown in FIG. 19. In FIG. 19, a processing device 1900 in a first node comprises a first receiver 1901.

In Embodiment 19, the receiver 1901 receives a first configuration information block, and receives a first reference signal and a first signal.

In Embodiment 19, the first configuration information block is used to determine configuration information for the first reference signal, the configuration information for the first reference signal including a first TCI state, the first TCI state indicating a second reference signal; the configuration information for the first reference signal is used to determine a first PCI, and the first signal indicates a second PCI, the first signal including a synchronization signal; the first reference signal and the first signal are overlapping in time domain; the second PCI is not equal to a PCI of a target cell, the target cell being a serving cell of the first node; whether the first reference signal and the first signal are quasi co-located is related to whether the first PCI and the second PCI are equal; when the first PCI is equal to the second PCI, the first reference signal and the first signal are quasi co-located.

In one embodiment, when the first PCI is not equal to the second PCI, the first node itself determines whether the first reference signal and the first signal are quasi co-located.

In one embodiment, when the first PCI is not equal to the second PCI, the first reference signal and the first signal are non-quasi co-located.

In one embodiment, whether a first condition is satisfied is used to determine whether the first reference signal and the first signal are quasi co-located; the first condition includes that there is a PCI in a first PCI set that is equal to the second PCI; a first TCI state set is used to determine the first PCI set, the first TCI state set being configurable; the first TCI state belongs to the first TCI state set.

In one embodiment, the first receiver 1901 receives a first information block; where the first information block indicates the first TCI state set.

In one embodiment, the first receiver 1901 receives a second configuration information block; where the second configuration information block indicates configuration information for the first signal.

In one embodiment, whether the first reference signal and the first signal are quasi co-located is used to determine a subcarrier spacing (SCS) of the first reference signal; when the first reference signal and the first signal are quasi co-located, the SCS of the first reference signal is equal to an SCS of the first signal.

In one embodiment, the first receiver 1901 receives the second reference signal.

In one embodiment, the first node is a UE.

In one embodiment, the first node is a relay node.

In one embodiment, the first reference signal comprises a CSI-RS, and the first signal comprises an SS/PBCH Block; the first TCI state is used to determine a QCL relationship of the first reference signal; the first TCI state is used to determine the first PCI; the first configuration information block is transmitted in a cell group to which the target cell belongs; a cell identified by the second PCI is not a serving cell of the first node.

In one embodiment, the first receiver 1901 comprises at least one of the antenna 452, the receiver 454, the receiving processor 456, the multi-antenna receiving processor 458, the controller/processor 459, the memory 460 or the data source 467 in Embodiment 4.

Embodiment 20

Embodiment 20 illustrates a structure block diagram of a processing device used in a second node according to one embodiment of the present application, as shown in FIG. 20. In FIG. 20, a processing device 2000 in a second node comprises a first transmitter 2001.

In Embodiment 20, the first transmitter 2001 transmits a first configuration information block.

In Embodiment 20, the first configuration information block is used to determine configuration information for a first reference signal, the configuration information for the first reference signal including a first TCI state, the first TCI state indicating a second reference signal; the first reference signal and a first signal are overlapping in time domain; the configuration information for the first reference signal is used to determine a first PCI, and the first signal indicates a second PCI, the first signal including a synchronization signal; the second PCI is not equal to a PCI of a target cell, the target cell being a serving cell of a target receiver of the first configuration information block; whether the first reference signal and the first signal are quasi co-located is related to whether the first PCI and the second PCI are equal; when the first PCI is equal to the second PCI, the first reference signal and the first signal are quasi co-located.

In one embodiment, when the first PCI is not equal to the second PCI, the target receiver of the first configuration information block itself determines whether the first reference signal and the first signal are quasi co-located.

In one embodiment, when the first PCI is not equal to the second PCI, the first reference signal and the first signal are non-quasi co-located.

In one embodiment, whether a first condition is satisfied is used to determine whether the first reference signal and the first signal are quasi co-located; the first condition includes that there is a PCI in a first PCI set that is equal to the second PCI; a first TCI state set is used to determine the first PCI set, the first TCI state set being configurable; the first TCI state belongs to the first TCI state set.

In one embodiment, the first transmitter 2001 transmits a first information block; where the first information block indicates the first TCI state set.

In one embodiment, the first transmitter 2001 transmits a second configuration information block; where the second configuration information block indicates configuration information for the first signal.

In one embodiment, whether the first reference signal and the first signal are quasi co-located is used to determine a subcarrier spacing (SCS) of the first reference signal; when the first reference signal and the first signal are quasi co-located, the SCS of the first reference signal is equal to an SCS of the first signal.

In one embodiment, the first transmitter 2001 transmits the first reference signal.

In one embodiment, the first transmitter 2001 transmits the second reference signal.

In one embodiment, the second node is a base station.

In one embodiment, the second node is a TRP device.

In one embodiment, the second node is a relay node.

In one embodiment, the second node is a CU device.

In one embodiment, the second node is a DU device.

In one embodiment, the first reference signal comprises a CSI-RS, and the first signal comprises an SS/PBCH Block; the first TCI state is used to determine a QCL relationship of the first reference signal; the first TCI state is used to determine the first PCI; the first configuration information block is transmitted in a cell group to which the target cell belongs; a cell identified by the second PCI is not a serving cell of the first node.

In one embodiment, the first transmitter 2001 comprises at least one of the antenna 420, the transmitter 418, the transmitting processor 416, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, vehicles, automobiles, RSU, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, eNB, gNB, Transmitter Receiver Point (TRP), GNSS, relay satellite, satellite base station, airborne base station, Road Side Unit (RSU), drones, test equipment like transceiving device simulating partial functions of base station or signaling tester.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:

a receiver configured to:

receive a first configuration information block that determines configuration information of a demodulation reference signal (DMRS), wherein the configuration information of the DMRS includes a transmission configuration indicator (TCI) state, and the TCI state indicates, in a same quasi-co-location info (QCL-info), a cell index and a second reference signal;

receive the DMRS and a synchronization signal/physical broadcast channel (SS/PBCH) signal in the same one or more orthogonal frequency division multiplexing (OFDM) symbols, wherein the cell index determines a first physical cell identifier (PCI), and the SS/PBCH signal indicates a second PCI that is not equal to a PCI of a serving cell of the UE;

wherein on a condition that the first PCI is equal to the second PCI, the DMRS and the SS/PBCH signal are quasi-co-located (QCL) with QCL-TypeD.

2. The UE of claim 1, wherein on a condition that the first PCI is not equal to the second PCI, the UE independently determines whether the DMRS and the SS/PBCH signal are quasi-co-located.

3. The UE of claim 1, wherein on a condition that the first PCI is not equal to the second PCI, the DMRS and the SS/PBCH signal are not quasi-co-located.

4. The UE of claim 1, wherein whether a first condition is satisfied is used to determine whether the DMRS and the SS/PBCH signal are quasi-co-located;

the first condition includes that there is a PCI in a PCI set equal to the second PCI;

a TCI state set is used to determine the PCI set, and the TCI state set is configurable; the TCI state belongs to the TCI state set.

5. The UE of claim 4, wherein the receiver is configured to receive an information block that indicates the TCI state set.

6. The UE of claim 1, wherein the receiver is configured to receive a second configuration information block that indicates configuration information of the SS/PBCH signal.

7. The UE of claim 1, wherein whether the DMRS and the SS/PBCH signal are quasi-co-located is used to determine a subcarrier spacing of the DMRS.

8. The UE of claim 7, wherein on a condition that the DMRS and the SS/PBCH signal are quasi-co-located, a subcarrier spacing of the DMRS is equal to a subcarrier spacing of the SS/PBCH signal.

9. The UE of claim 1, wherein a TCI state of the second reference signal indicates a third reference signal, and the third reference signal is quasi-co-located with the SS/PBCH signal.

10. The UE of claim 1, wherein the serving cell is a special cell (SpCell) or a secondary cell (SCell) of the UE; a cell identified by the second PCI is neither a SpCell of the UE nor an SCell of the UE.

11. A method performed by a user equipment (UE), the method comprising:

receiving a first configuration information block that determines configuration information of a demodulation reference signal (DMRS), wherein the configuration information of the DMRS includes a transmission configuration indicator (TCI) state, and the TCI state indicates, in a same quasi-co-location info (QCL-info), a cell index and a second reference signal;

receiving the DMRS and a synchronization signal/physical broadcast channel (SS/PBCH) signal in the same one or more orthogonal frequency division multiplexing (OFDM) symbols, wherein the cell index determines a first physical cell identifier (PCI), and the SS/PBCH signal indicates a second PCI that is not equal to a PCI of a serving cell of the UE;

wherein on a condition that the first PCI is equal to the second PCI, the DMRS and the SS/PBCH signal are quasi-co-located (QCL) with QCL-TypeD.

12. The method of claim 11, wherein on a condition that the first PCI is not equal to the second PCI, the UE independently determines whether the DMRS and the SS/PBCH signal are quasi-co-located.

13. The method of claim 11, wherein on a condition that the first PCI is not equal to the second PCI, the DMRS and the SS/PBCH signal are not quasi-co-located.

14. The method of claim 11, wherein whether a first condition is satisfied is used to determine whether the DMRS and the SS/PBCH signal are quasi-co-located; the first condition includes that there is a PCI in a PCI set equal to the second PCI; a TCI state set is used to determine the PCI set, and the TCI state set is configurable; the TCI state belongs to the TCI state set.

15. The method of claim 14, further comprising:

receiving an information block that indicates the TCI state set.

16. The method of claim 11, further comprising:

receiving a second configuration information block that indicates configuration information of the SS/PBCH signal.

17. The method of claim 11, wherein whether the DMRS and the SS/PBCH signal are quasi-co-located is used to determine a subcarrier spacing of the DMRS.

18. The method of claim 17, wherein on a condition that the DMRS and the SS/PBCH signal are quasi-co-located, a subcarrier spacing of the DMRS is equal to a subcarrier spacing of the SS/PBCH signal.

19. The method of claim 11, wherein a TCI state of the second reference signal indicates a third reference signal, and the third reference signal is quasi-co-located with the SS/PBCH signal.

20. The method of claim 11, wherein the serving cell is a special cell (SpCell) or a secondary cell (SCell) of the UE; a cell identified by the second PCI is neither a SpCell of the UE nor an SCell of the UE.

* * * * *